(12) United States Patent
Garvey et al.

(10) Patent No.: US 11,138,090 B2
(45) Date of Patent: Oct. 5, 2021

(54) SYSTEMS AND METHODS FOR FORECASTING TIME SERIES WITH VARIABLE SEASONALITY

(71) Applicant: Oracle International Corporation, Redwood Shores, CA (US)

(72) Inventors: Dustin Garvey, Exeter, NH (US); Sampanna Shahaji Salunke, Dublin, CA (US); Uri Shaft, Fremont, CA (US); Sumathi Gopalakrishnan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 494 days.

(21) Appl. No.: 16/168,390

(22) Filed: Oct. 23, 2018

(65) Prior Publication Data
US 2020/0125471 A1   Apr. 23, 2020

(51) Int. Cl.
*G06F 11/34* (2006.01)
*G06F 17/18* (2006.01)
(Continued)

(52) U.S. Cl.
CPC ...... *G06F 11/3452* (2013.01); *G06F 11/3419* (2013.01); *G06F 16/285* (2019.01);
(Continued)

(58) Field of Classification Search
CPC .... G06F 11/3452; G06F 17/18; G06F 16/285; G06F 11/3419; G06F 2201/81;
(Continued)

(56) References Cited

U.S. PATENT DOCUMENTS 6,298,063 B1   10/2001   Coile et al.
6,438,592 B1   8/2002   Killian
(Continued)

FOREIGN PATENT DOCUMENTS

CN   105426411 A   3/2016
CN   109359763 A   2/2019
(Continued)

OTHER PUBLICATIONS

Li et al., "Forecasting Web Page Views: Methods and Observations," in 9 J. Machine Learning Res. 2217-50 (2008). (Year: 2008).
(Continued)

*Primary Examiner* — Michael P Nghiem
(74) *Attorney, Agent, or Firm* — Invoke

(57) ABSTRACT

Techniques for training and evaluating seasonal forecasting models are disclosed. In some embodiments, a network service generates, in memory, a set of data structures that separate sample values by season type and season space. The set of data structures may include a first set of clusters corresponding to different season types in the first season space and a second set of clusters corresponding to different season types in the second season space. The network service merges two or more clusters the first set and/or second set of clusters. Clusters from the first set are not merged with clusters from the second set. After merging the clusters, the network service determines a trend pattern for each of the remaining clusters in the first and second set of clusters. The network service then generates a forecast for a metric of a computing resource based on the trend patterns for each remaining cluster.

20 Claims, 17 Drawing Sheets

(51) Int. Cl.
*G06F 16/28* (2019.01)
*G06K 9/62* (2006.01)
*G06N 20/00* (2019.01)
*G06N 7/00* (2006.01)

(52) U.S. Cl.
CPC ........... *G06F 17/18* (2013.01); *G06K 9/6262* (2013.01); *G06K 9/6284* (2013.01); *G06N 7/005* (2013.01); *G06N 20/00* (2019.01); *G06F 2201/81* (2013.01); *G06F 2201/835* (2013.01)

(58) Field of Classification Search
CPC ............ G06F 2201/835; G06K 9/6284; G06K 9/6262; G06N 20/00; G06N 7/005
USPC ........................................................ 702/181
See application file for complete search history.

(56) References Cited

U.S. PATENT DOCUMENTS

| | | |
|---|---|---|
| 6,597,777 B1 | 7/2003 | Ho |
| 6,643,613 B2 | 11/2003 | McGee et al. |
| 6,996,599 B1 | 2/2006 | Anders et al. |
| 7,343,375 B1 | 3/2008 | Dulac |
| 7,529,991 B2 | 5/2009 | Ide et al. |
| 7,672,814 B1 | 3/2010 | Raanan et al. |
| 7,739,143 B1 | 6/2010 | Dwarakanath et al. |
| 7,739,284 B2 | 6/2010 | Aggarwal et al. |
| 7,783,510 B1 | 8/2010 | Gilgur et al. |
| 7,987,106 B1 | 7/2011 | Aykin |
| 8,200,454 B2 | 6/2012 | Dorneich et al. |
| 8,229,876 B2 | 7/2012 | Roychowdhury |
| 8,234,236 B2 | 7/2012 | Beaty et al. |
| 8,363,961 B1 | 1/2013 | Avidan et al. |
| 8,576,964 B2 | 11/2013 | Taniguchi et al. |
| 8,650,299 B1 | 2/2014 | Huang et al. |
| 8,676,964 B2 | 3/2014 | Gopalan et al. |
| 8,694,969 B2 | 4/2014 | Bernardini et al. |
| 8,776,066 B2 | 7/2014 | Krishnamurthy et al. |
| 8,880,525 B2 | 11/2014 | Galle et al. |
| 8,930,757 B2 | 1/2015 | Nakagawa |
| 8,949,677 B1 | 2/2015 | Brundage et al. |
| 9,002,774 B2 | 4/2015 | Karlsson |
| 9,141,914 B2 | 9/2015 | Viswanathan et al. |
| 9,147,167 B2 | 9/2015 | Urmanov et al. |
| 9,195,563 B2 | 11/2015 | Scarpelli |
| 9,218,232 B2 | 12/2015 | Khalastchi et al. |
| 9,292,408 B2 | 3/2016 | Bernstein et al. |
| 9,323,599 B1 | 4/2016 | Iyer et al. |
| 9,323,837 B2 | 4/2016 | Zhao et al. |
| 9,330,119 B2 | 5/2016 | Chan et al. |
| 9,355,357 B2 | 5/2016 | Hao et al. |
| 9,367,382 B2 | 6/2016 | Yabuki |
| 9,389,946 B2 | 7/2016 | Higuchi |
| 9,471,778 B1 | 10/2016 | Seo et al. |
| 9,495,220 B2 | 11/2016 | Talyansky |
| 9,507,718 B2 | 11/2016 | Rash et al. |
| 9,514,213 B2 | 12/2016 | Wood et al. |
| 9,529,630 B1 | 12/2016 | Fakhouri et al. |
| 9,658,916 B2 | 5/2017 | Yoshinaga et al. |
| 9,692,662 B2 | 6/2017 | Chan et al. |
| 9,710,493 B2 | 7/2017 | Wang et al. |
| 9,727,533 B2 | 8/2017 | Thibaux |
| 9,740,402 B2 | 8/2017 | Manoharan et al. |
| 9,779,361 B2 | 10/2017 | Jones et al. |
| 9,811,394 B1 | 11/2017 | Kogias et al. |
| 9,961,571 B2 | 5/2018 | Yang et al. |
| 10,069,900 B2 * | 9/2018 | Poola ................. G06N 7/00 |
| 10,073,906 B2 * | 9/2018 | Lu ....................... G06F 16/285 |
| 10,127,695 B2 * | 11/2018 | Garvey ................. G06Q 10/06 |
| 10,198,339 B2 * | 2/2019 | Salunke ................ G06F 11/34 |
| 10,210,036 B2 | 2/2019 | Iyer et al. |
| 10,331,802 B2 * | 6/2019 | Garvey ................. G06F 16/285 |
| 10,692,255 B2 | 6/2020 | Garvey et al. |
| 10,699,211 B2 * | 6/2020 | Garvey ................. G06N 20/00 |
| 10,867,421 B2 * | 12/2020 | Garvey ................. G06Q 10/04 |
| 10,885,461 B2 * | 1/2021 | Garvey ................. G06N 20/00 |
| 10,915,830 B2 * | 2/2021 | Garvey ................. G06N 7/005 |
| 10,970,891 B2 * | 4/2021 | Garvey ................. G06T 11/206 |
| 2002/0019860 A1 | 2/2002 | Lee et al. |
| 2002/0092004 A1 | 7/2002 | Lee et al. |
| 2002/0183972 A1 | 12/2002 | Enck et al. |
| 2002/0188650 A1 | 12/2002 | Sun et al. |
| 2003/0149603 A1 | 8/2003 | Ferguson et al. |
| 2003/0224344 A1 | 12/2003 | Shamir et al. |
| 2004/0088406 A1 | 5/2004 | Corley et al. |
| 2005/0119982 A1 | 6/2005 | Ito et al. |
| 2005/0132030 A1 | 6/2005 | Hopen et al. |
| 2005/0159927 A1 | 7/2005 | Cruz et al. |
| 2005/0193281 A1 | 9/2005 | Ide et al. |
| 2006/0087962 A1 | 4/2006 | Golia et al. |
| 2006/0106743 A1 | 5/2006 | Horvitz |
| 2006/0106797 A1 | 5/2006 | Srinivasa et al. |
| 2006/0161485 A1 | 7/2006 | Meldahl |
| 2006/0212593 A1 | 9/2006 | Patrick et al. |
| 2006/0287848 A1 | 12/2006 | Li et al. |
| 2007/0011281 A1 | 1/2007 | Jhoney et al. |
| 2007/0150329 A1 | 6/2007 | Brook et al. |
| 2007/0179836 A1 | 8/2007 | Juang et al. |
| 2008/0221974 A1 | 9/2008 | Gilgur et al. |
| 2008/0288089 A1 | 11/2008 | Pettus et al. |
| 2009/0024427 A1 | 1/2009 | Shan |
| 2009/0030752 A1 | 1/2009 | Senturk-Doganaksoy et al. |
| 2010/0027552 A1 | 2/2010 | Hill |
| 2010/0036857 A1 | 2/2010 | Marvasti et al. |
| 2010/0050023 A1 | 2/2010 | Scarpelli et al. |
| 2010/0082132 A1 | 4/2010 | Marruchella et al. |
| 2010/0082697 A1 | 4/2010 | Gupta et al. |
| 2010/0185499 A1 | 7/2010 | Dwarakanath et al. |
| 2010/0257133 A1 | 10/2010 | Crowe et al. |
| 2010/0324869 A1 | 12/2010 | Cherkasova et al. |
| 2011/0022879 A1 | 1/2011 | Chavda et al. |
| 2011/0040575 A1 | 2/2011 | Wright et al. |
| 2011/0125894 A1 | 5/2011 | Anderson et al. |
| 2011/0126197 A1 | 5/2011 | Larsen et al. |
| 2011/0126275 A1 | 5/2011 | Anderson et al. |
| 2011/0213788 A1 | 9/2011 | Zhao et al. |
| 2011/0265164 A1 | 10/2011 | Lucovsky et al. |
| 2012/0005359 A1 | 1/2012 | Seago et al. |
| 2012/0051369 A1 | 3/2012 | Bryan et al. |
| 2012/0066389 A1 | 3/2012 | Hegde et al. |
| 2012/0110462 A1 | 5/2012 | Eswaran et al. |
| 2012/0110583 A1 | 5/2012 | Balko et al. |
| 2012/0203823 A1 | 8/2012 | Manglik et al. |
| 2012/0240072 A1 | 9/2012 | Altamura et al. |
| 2012/0254183 A1 | 10/2012 | Ailon et al. |
| 2012/0278663 A1 | 11/2012 | Hasegawa |
| 2012/0323988 A1 | 12/2012 | Barzel et al. |
| 2013/0024173 A1 | 1/2013 | Brzezicki et al. |
| 2013/0080374 A1 | 3/2013 | Karlsson |
| 2013/0151179 A1 | 6/2013 | Gray |
| 2013/0226320 A1 | 8/2013 | Berg-Sonne et al. |
| 2013/0282891 A1 | 10/2013 | Davis et al. |
| 2013/0326202 A1 | 12/2013 | Rosenthal et al. |
| 2013/0329981 A1 | 12/2013 | Hiroike |
| 2014/0058572 A1 | 2/2014 | Stein et al. |
| 2014/0067757 A1 | 3/2014 | Ailon et al. |
| 2014/0095422 A1 | 4/2014 | Solomon et al. |
| 2014/0101300 A1 | 4/2014 | Rosensweig et al. |
| 2014/0215470 A1 | 7/2014 | Iniguez |
| 2014/0310235 A1 | 10/2014 | Chan et al. |
| 2014/0310714 A1 | 10/2014 | Chan et al. |
| 2014/0325649 A1 | 10/2014 | Zhang |
| 2014/0379717 A1 | 12/2014 | Urmanov et al. |
| 2015/0032775 A1 | 1/2015 | Yang et al. |
| 2015/0033084 A1 | 1/2015 | Sasturkar et al. |
| 2015/0040142 A1 | 2/2015 | Cheetancheri et al. |
| 2015/0046123 A1 | 2/2015 | Kato |
| 2015/0046920 A1 | 2/2015 | Allen |
| 2015/0065121 A1 | 3/2015 | Gupta et al. |
| 2015/0180734 A1 | 6/2015 | Maes et al. |
| 2015/0242243 A1 | 8/2015 | Balakrishnan et al. |
| 2015/0244597 A1 | 8/2015 | Maes et al. |

(56) References Cited

U.S. PATENT DOCUMENTS

| | | | |
|---|---|---|---|
| 2015/0248446 | A1 | 9/2015 | Nordstrom et al. |
| 2015/0251074 | A1 | 9/2015 | Ahmed et al. |
| 2015/0296030 | A1 | 10/2015 | Maes et al. |
| 2015/0302318 | A1 | 10/2015 | Chen et al. |
| 2015/0312274 | A1 | 10/2015 | Bishop et al. |
| 2015/0317589 | A1 | 11/2015 | Anderson et al. |
| 2015/0371144 | A1 | 12/2015 | Engle |
| 2016/0034328 | A1 | 2/2016 | Poola et al. |
| 2016/0042289 | A1 | 2/2016 | Poola et al. |
| 2016/0092516 | A1 | 3/2016 | Poola et al. |
| 2016/0105327 | A9 | 4/2016 | Cremonesi et al. |
| 2016/0139964 | A1 | 5/2016 | Chen et al. |
| 2016/0171037 | A1 | 6/2016 | Mathur et al. |
| 2016/0253381 | A1 | 9/2016 | Kim et al. |
| 2016/0283533 | A1 | 9/2016 | Urmanov et al. |
| 2016/0292611 | A1 | 10/2016 | Boe et al. |
| 2016/0294773 | A1 | 10/2016 | Yu et al. |
| 2016/0299938 | A1 | 10/2016 | Malhotra et al. |
| 2016/0299961 | A1 | 10/2016 | Olsen |
| 2016/0321588 | A1 | 11/2016 | Das et al. |
| 2016/0342909 | A1 | 11/2016 | Chu et al. |
| 2016/0357674 | A1 | 12/2016 | Waldspurger et al. |
| 2016/0378809 | A1 | 12/2016 | Chen et al. |
| 2017/0061321 | A1 | 3/2017 | Maiya et al. |
| 2017/0249564 | A1 | 8/2017 | Garvey et al. |
| 2017/0249648 | A1 | 8/2017 | Garvey et al. |
| 2017/0249649 | A1* | 8/2017 | Garvey ............... G06Q 10/0631 |
| 2017/0249763 | A1 | 8/2017 | Garvey et al. |
| 2017/0262223 | A1 | 9/2017 | Dalmatov et al. |
| 2017/0329660 | A1 | 11/2017 | Salunke et al. |
| 2017/0351563 | A1 | 12/2017 | Miki et al. |
| 2017/0364851 | A1 | 12/2017 | Maheshwari et al. |
| 2018/0026907 | A1 | 1/2018 | Miller et al. |
| 2018/0039555 | A1 | 2/2018 | Salunke et al. |
| 2018/0052804 | A1 | 2/2018 | Mikami et al. |
| 2018/0053207 | A1 | 2/2018 | Modani et al. |
| 2018/0059628 | A1 | 3/2018 | Yoshida |
| 2018/0081629 | A1 | 3/2018 | Kuhhirte et al. |
| 2018/0219889 | A1 | 8/2018 | Oliner et al. |
| 2018/0247215 | A1* | 8/2018 | Garvey ................... G06N 20/00 |
| 2018/0268152 | A1* | 9/2018 | Cuomo ................ H04L 9/3297 |
| 2018/0321989 | A1 | 11/2018 | Shetty et al. |
| 2018/0324199 | A1 | 11/2018 | Crotinger et al. |
| 2018/0330433 | A1 | 11/2018 | Frenzel et al. |
| 2018/0349797 | A1* | 12/2018 | Garvey ................. G06F 9/5077 |
| 2018/0351786 | A1 | 12/2018 | Pope et al. |
| 2019/0042982 | A1 | 2/2019 | Qu et al. |
| 2019/0065275 | A1 | 2/2019 | Wong et al. |
| 2019/0305876 | A1 | 10/2019 | Sundaresan et al. |
| 2020/0034745 | A1 | 1/2020 | Nagpal et al. |
| 2020/0125988 | A1* | 4/2020 | Garvey .................... G06N 5/02 |

FOREIGN PATENT DOCUMENTS

| | | |
|---|---|---|
| JP | 2006-129446 A | 5/2006 |
| WO | 2011/071624 A2 | 6/2011 |
| WO | 2013/016584 A1 | 1/2013 |

OTHER PUBLICATIONS

Suntinger, "Trend-based similarity search in time-series data," 2010, Second International Conference on Advances in Databases, Knowledge, and Data Applications, IEEE, pp. 97-106 (Year: 2010).

Time Series Pattern Search: A tool to extract events from time series data, available online at <https://www.ceadar.ie/pages/time-series-pattern-search/>, retrieved on Apr. 24, 2020, 4 pages.

Wilks, Samuel S. "Determination of sample sizes for setting tolerance limits," The Annals of Mathematical Statistics 12.1 (1941): 91-96.

Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.

Lin, Xuemin, et al. "Continuously maintaining quantile summaries of the most recent n elements over a data stream," IEEE, 2004.

Greenwald et al. "Space-efficient online computation of quantile summaries." ACM Proceedings of the 2001 SIGMOD international conference on Management of data pp. 58-66.

Dunning et al., Computing Extremely Accurate Quantiles Using t-Digests.

Lehmann, "Variability of Atmospheric Circulation Patterns Associated With Large Volume Changes of the Baltic Sea", Adv. Sci. Res., 12, 219-225, 2015, www.adv-sci-res.net/12/219/2015/doi:10.5.194/asr-12-219-2015 (Year: 2015).

Toreti, "A Novel Approach for the Detection of Inhomogeneities Affecting Climate Time Series", Journal of Applied Meteorology and Climatology, vol. 51, Feb. 2012, DOI: 10.1175/JAMC-D-10-05033.1 (Year: 2012).

Zhai, "Spatial Variation and Trends in PDSI and SPI Indices and Their Relation To Streamflow in 10 Large Regions of China", 2010, Journal of Climate, vol. 23, 2010 American Meteorological Society, DOI: 10.1175/2009JCLI2968.1 (Year: 2010).

Charapko, Gorilla—Facebook's Cache for Time Series Data, http://charap.co/gorilla-facebooks-cache-for-monitoring-data/, Jan. 11, 2017.

Time Series Pattern Search: A tool to extract events from time series data, available online at <https://www.ceadar.ie/pages/time-series-pattern-search/>, retrieved on Apr. 24, 2020, 4 pages.

Yin, "System resouice utilization analysis and prediction for cloud based applications under bursty workloads," 2014, Information Sciences, vol. 279, pp. 338-357 (Year: 2014).

Greunen, "Forecasting Methods for Cloud Hosted Resources, a comparison," 2015, 11th International Conference on Network and Service Management (CNSM), pp. 29-35 (Year: 2015).

Herbst, "Self-adaptive workload classification and forecasting for proactive resource provisioning", 2014, ICPE'13, pp. 187-198 (Year: 2014).

Hao et al., Visual Analytics of Anomaly Detection in Large Data Streams, Proc. SPIE 7243, Visualization and Data Analysis 2009, 10 pages.

Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.

Ahmed, Reservoir-based network traffic stream summarization for anomaly detection, Article in Pattern Analysis and Applications, Oct. 2017.

Faraz Rasheed, "A Framework for Periodic Outlier Pattern Detection in Time-Series Sequences," May 2014, IEEE.

Jain and Chlamtac, P-Square Algorithm for Dynamic Calculation of Quantiles and Histograms Without Storing Observations, ACM, Oct. 1985 (10 pages).

Yokoyama, Tetsuya, "Windows Server 2008, Certification Test, Part 5: Reliability", Apr. 15, 2008, pp. 124-125 along with 4 pages of English Translation.

Willy Tarreau: "HAProxy Architecture Guide", May 25, 2008 (May 25, 2008), XP055207566, Retrieved from the Internet: URL:http://www.haproxy.org/download/1.2/doc/architecture.txt [retrieved on Aug. 13, 2015].

Voras I et al: "Evaluating open-source cloud computing solutions", MIPRO, 2011 Proceedings of the 34th International Convention, IEEE, May 23, 2011 (May 23, 2011), pp. 209-214.

Voras et al., "Criteria for evaluation of Open Source Cloud Computing Solutions", Information Technology Interfaces (ITI), Proceedings of the ITI 2011 33rd International Conference on Information Technology Interfaces, US, IEEE, Jun. 27-30, 2011, pp. 137-142.

Taylor J W et al: "Forecasting intraday time series with multiple seasonal cycles using parsimonious seasonal exponential smoothing", OMEGA, vol. 40, No. 6, Dec. 2012 (Dec. 2012), pp. 748-757.

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.

Somlo, Gabriel, et al., "Incremental Clustering for Profile Maintenance in Information Gathering Web Agents", Agents '01, Montreal, Quebec, Canada, May 28-Jun. 1, 2001, pp. 262-269.

(56) References Cited

OTHER PUBLICATIONS

Slipetskyy, Rostyslav, "Security Issues in OpenStack", Maste s Thesis, Technical University of Denmark, Jun. 2011, p. 7 (entire document especially abstract).

Nurmi D et al: "The Eucalyptus Open-Source Cloud-Computing System", Cluster Computing and the Grid, 2009. CCGRID '09. 9th IEEE/ACM International Symposium On, IEEE, Piscataway, NJ, USA, May 18, 2009 (May 18, 2009), pp. 124-131.

NPL: Web document dated Feb. 3, 2011, Title: OpenStack Compute, Admin Manual.

Niino, Junichi, "Open Source Cloud Infrustructure 'OpenStack', its History and Scheme", Available online at <http://www.publickey1.jp/blog/11/openstack_1.html>, Jun. 13, 2011, 8 pages (Japanese Language Copy Only) (See Communication under 37 CFR .Sctn 1.98 (3)).

Jarvis, R. A., et al., "Clustering Using a Similarity Measure Based on Shared Neighbors", IEEE Transactions on Computers, vol. C-22, No. 11, Nov. 1973, pp. 1025-1034.

Haugen et al., "Extracting Common Time Trends from Concurrent Time Series: Maximum Autocorrelation Factors with Applications", Stanford University, Oct. 20, 2015, pp. 1-38.

Gueyoung Jung et al: "Performance and availability aware regeneration for cloud based multitier applications", Dependable Systems and Networks (DSN), 2010 IEEE/IFIP International Conference On, IEEE, Piscataway, NJ, USA, Jun. 28, 2010 (Jun. 28, 2010), pp. 497-506.

Davies, David L., et al., "A Cluster Separation measure", IEEE Transactions on Pattern Analysis and Machine Intelligence, vol. PAMI-1, No. 2, Apr. 1979, pp. 224-227.

Chris Bunch et al: "AppScale: Open-Source Platform-As-A-Service", Jan. 1, 2011 (Jan. 1, 2011), XP055207440, Retrieved from the Internet: URL:http://128.111.41.26/research/tech reports/reports/2011-01 .pdf [retrieved on Aug. 12, 2015] pp. 2-6.

Anonymous: "High Availability for the Ubuntu Enterprise Cloud (UEC)—Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1.

Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemaker-1.0-Clusters from Scratch-en-US.pdi [retrieved on Aug. 13, 2015].

Alberto Zuin: "OpenNebula Setting up High Availability in OpenNebula with LVM", May 2, 2011 (May 2, 2011), XP055207701, Retrieved from the Internet: URL:http://opennebula.org/setting-up-highavailability-in-opennebula-with-lvm/ [retrieved on Aug. 13, 2015] p. 1.

"OpenStack Object Storage Administrator Manual", Jun. 2, 2011 (Jun. 2, 2011), XP055207490, Retrieved from the Internet: URL:http://web.archive.org/web/20110727190919/http://docs.openstack.org/cactus/openstack-object-storage/admin/os-objectstorage-adminguide-cactus.pdf [retrieved on Aug. 12, 2015].

"OpenStack Compute Administration Manual", Mar. 1, 2011 (Mar. 1, 2011), XP055207492, Retrieved from the Internet: URL:http://web.archive.org/web/20110708071910/http://docs.openstack.org/bexar/openstack-compute/admin/os-compute-admin-book-bexar.pdf [retrieved on Aug. 12, 2015].

\* cited by examiner

| Encoding Space/Season Type 602 | Variations 604 | Example(s) 606 | Encoding(s) 608 |
|---|---|---|---|
| Day of Week | | Every Monday of the Week | D002 |
| Day of Bi-Week | | Every Other Friday | D013 |
| Day of Month | 1-3 Months | Every 15th Every Other Month | M02-D015 |
| Day Remaining Count | 1-3 Months with Month Offsets | Every Next to Last Day of the Quarter | D001 |
| Day of Week Count | 1-3 Months with Month Offsets | Every 12th Sunday of the Quarter with Q1 Starting in February | D001-D012 |
| Days of Week Remaining Count | 1-3 Months with Month Offsets | Every Last Saturday of the Quarter | DC07-C001 |
| Day of Week in Week Count | 1-3 Months with Month Offsets | Every Monday of the 10th Week in the Quarter | W10-D002 |
| Day of Week in Remaining Week Count | 1-3 Months with Month Offsets | Every Wednesday of the Next to Last Week of the Month | W02-D004 |
| Business Day Count | 1-3 Months with Month Offsets | Every 10th Business Day of the Month | D010 |
| Business Days Remaining | 1-3 Months with Month Offsets | Every Next to Last Business Day of the Quarter with Q1 Starting in March | D002 |
| Weekend Day Count | 1-3 Months with Month Offsets | Every 8th Weekend Day of Every Other Month | D008 |
| Weekend Days Remaining | 1-3 Months with Month Offsets | Every Next to Last Weekend Day of the Quarter | D002 |
| Business Day Before Adjusted Day of Month | 1-3 Month | Every 15th of the Month or the First Business Day Before if the 15th is a Weekend | M01-D015 |
| Business Day After Adjusted Day of Month | 1-3 Month | Every 20th of Every Other Month or the First Business Day After if the 20th is a Weekend | M02-D020 |
| Weekend Day Before Adjusted Day of Month | 1-3 Month | Every 15th of the Month or the First Weekend Day Before if the 15th is a Business Day | M01-D015 |
| Weekend Day After Adjusted Day of Month | 1-3 Month | Every 20th of Every Other Month or the First Weekend Day After if the 20th is a Business Day | M02-D020 |
| Day of Year | | Every December 25th | D359 |

FIG. 6

SYSTEMS AND METHODS FOR FORECASTING TIME SERIES WITH VARIABLE SEASONALITY

RELATED APPLICATIONS; INCORPORATION BY REFERENCE

This application is related to U.S. application Ser. No. 15/266,971, now U.S. Pat. No. 10,867,421, entitled "SEASONALAWARE METHOD FOR FORECASTING AND CAPACITY PLANNING"; U.S. application Ser. No. 15/445,763, now U.S. Pat. No. 10,127,695, entitled "METHOD FOR CREATING PERIOD PROFILE FOR TIME-SERIES DATA WITH RECURRENT PATTERNS"; U.S. application Ser. No. 15/266,979, now U.S. Pat. No. 10,970,891, entitled "SYSTEMS AND METHODS FOR DETECTING AND ACCOMODATING STATE CHANGES IN MODELLING"; U.S. application Ser. No. 15/140,358, now U.S. Pat. No. 10,073,906, entitled "SCALABLE TRI-POINT ARBITRATION AND CLUSTERING"; U.S. applicaton Ser. No. 15/057,065, now U.S. Pat. No. 10,331,802, entitled "SYSTEM FOR DETECTING AND CHARACTERIZING SEASONS"; U.S. application Ser. No. 15/057,060, now U.S. Pat. No. 10,699,211, entitled "SUPERVISED METHOD FOR CLASSIFYING SEASONAL PATTERNS"; U.S. application Ser. No. 15/057,062, now U.S. Pat. No. 10,885,461, entitled "UNSUPERVISED METHOD FOR CLASSIFYING SEASONAL PATTERNS"; U.S. application Ser. No. 15/155,486, now U.S. Pat. No. 10,198,339, entitled "CORRELATION-BASED ANALYTIC FOR TIME-SERIES DATA"; U.S. application Ser. No. 15/266,987, entitled "SYSTEMS AND METHODS FOR TRENDING PATTERNS WITHIN TIME-SERIES DATA"; U.S. application Ser. No. 14/452,283, now U.S. Pat. No. 10,069,900, entitled "SYSTEMS AND METHODS FOR ADAPTIVE THRESHOLDING USING MAXIMUM CONCENTRATION INTERVALS"; and U.S. application Ser. No. 15/643,179, now U.S. Pat. No. 10,915,830, entitled "MULTISCALE METHOD FOR PREDICTIVE ALERTING", the entire contents for each of which are incorporated by reference herein as if set forth in their entirety.

TECHNICAL FIELD

The present disclosure relates, generally, to machine-learning systems and methods for seasonal pattern detection and forecasting. The disclosure relates more specifically to computer-implemented techniques for building, training, and evaluating machine-learning models that capture patterns with variable seasonality.

BACKGROUND

A time-series is a sequence of data points that are typically obtained by capturing measurements from one or more sources over a period of time. As an example, resource management systems may collect, continuously or over a predetermined time interval, various performance metrics for software and hardware resources that are deployed within a datacenter environment. Analysts may apply forecasting models to time-series data in an attempt to predict future events based on observed measurements. One machine-learning model is the Holt-Winters forecasting model, also referred to as triple exponential smoothing.

The Holt-Winters forecasting model takes into account both trends and seasonality in the time-series data in order to formulate a prediction about future values. A trend in this context refers to the tendency of the time series data to increase or decrease over time, and seasonality refers to the tendency of time series data to exhibit behavior that periodically repeats itself. A season generally refers to the period of time before an exhibited behavior begins to repeat itself. The additive seasonal model is given by the following formulas:

$$L_t = \alpha(X_t - S_{t-p}) + (1-\alpha)(L_{t-1} + T_{t-1}) \quad (1)$$

$$T_t = \gamma(L_t - L_{t-1}) + (1-\gamma)T_{t-1} \quad (2)$$

$$S_t = \delta(X_t - L_t) + (1-\delta)S_{t-p} \quad (3)$$

where $X_t$, $L_t$, $T_t$, and $S_t$ denote the observed level, local mean level, trend, and seasonal index at time t, respectively. Parameters $\alpha$, $\gamma$, $\delta$ denote smoothing parameters for updating the mean level, trend, and seasonal index, respectively, and p denotes the duration of the seasonal pattern. The forecast is given as follows:

$$F_{t+k} = L_t + k\, T_t + S_{t+k-p} \quad (4)$$

where $F_{t+k}$ denotes the forecast at future time t+k.

The additive seasonal model is typically applied when seasonal fluctuations are independent of the overall level of the time series data. An alternative, referred to as the multiplicative model, is often applied if the size of seasonal fluctuations vary based on the overall level of the time series data. The multiplicative model is given by the following formulas:

$$L_t = \alpha(X_t/S_{t-p}) + (1-\alpha)(L_{t-1} + T_{t-1}) \quad (5)$$

$$T_t = \gamma(L_t - L_{t-1}) + (1-\gamma)T_{t-1} \quad (6)$$

$$S_t = \delta(X_t/L_t) + (1-\delta)S_{t-p} \quad (7)$$

where, as before, $X_t$, $L_t$, $T_t$, and $S_t$ denote the observed level, local mean level, trend, and seasonal index at time t, respectively. The forecast is then given by the following formula:

$$F_{t+k} = (L_t + k\, T_t)\, S_{t+k-p} \quad (8)$$

While the Holt-Winter additive and multiplicative models take into account seasonal indices to generate the forecast, these models provide limited information on any seasonal patterns that may exist in the time series data. In particular, the seasonal indices represented by equations (3) and (7) are typically implemented as internal structures that operate within the bounds of the forecasting models to which they are tied. As a result, the seasonal data output by these formulas does not lend itself to meaningful interpretation in contexts outside of the specific forecasting models for which the seasonal data was generated. Further, the end user may have little or no underlying notion of any seasonal data that was used in generating a forecast.

Another deficiency of the Holt-Winters model is the limited ability to represent complex seasonal patterns. The seasonal indices of the Holt-Winters model assume a cycle of seasonal change of length L. However, a time-series may include multiple seasonal patterns that have different seasonal lengths. In addition, individual seasonal patterns may have varying seasonal lengths. For example, the length of a monthly pattern may vary between 28 and 31 days. A failure to accurately learn and model variability in the lengths of a season may result in inaccurate forecasting. As previously indicated, inaccurate forecasts may lead to poor capacity planning and inefficient resource utilization.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates an example set of encodings for candidate seasons in accordance with some embodiments;

DETAILED DESCRIPTION

Figure 1:
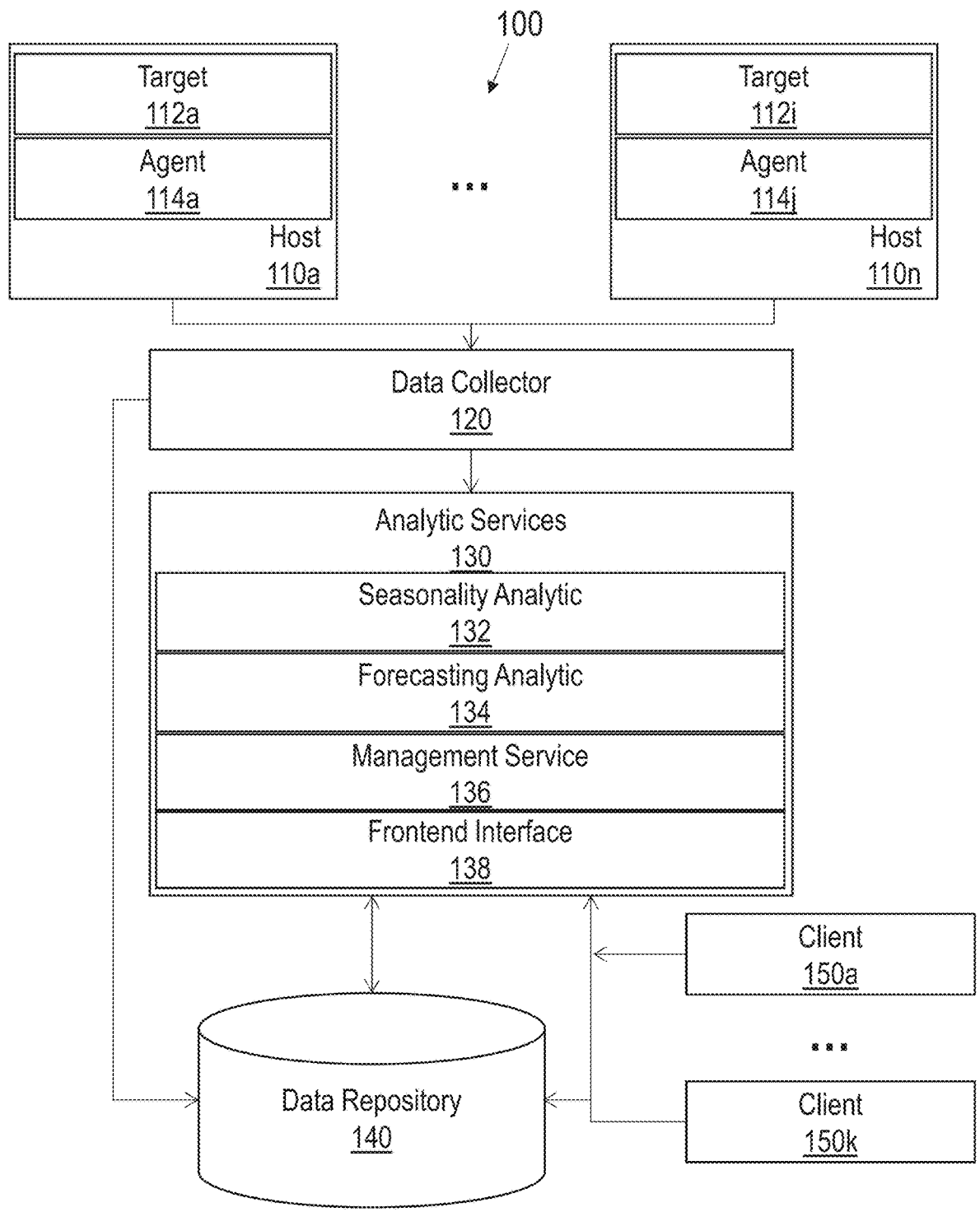
FIG. 1 illustrates an example system for learning seasonal patterns and performing seasonal-aware operations in accordance with some embodiments

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 SYSTEM ARCHITECTURE
3.0 MACHINE-LEARNING TECHNIQUES FOR DETECTING LONG-TERM SEASONS
   3.1 CONVERTING TIME-SERIES DATA TO THE OUTLIER SPACE
   3.2 ENCODINGS FOR CANDIDATE SEASON DETECTION
   3.3 HANDLING AMBIGUOUS SEASONS
   3.4 SELECTING AND REPRESENTING SEASONAL PATTERNS
4.0 MODELLING PATTERNS TO ACCOUNT FOR VARIABLE SEASONALITY
   4.1 CLUSTERING SAMPLES BY SEASON TYPE AND SPACE
   4.2 TRAINING A FORECASTING MODEL FROM CLUSTERED SAMPLES
   4.3 GENERATING FORECASTS
5.0 SEASONAL-AWARE MANAGEMENT OPERATIONS
6.0 COMPUTER NETWORKS AND CLOUD NETWORKS
7.0 MICRO SERVICE APPLICATIONS
8.0 HARDWARE OVERVIEW
9.0 MISCELLANEOUS; EXTENSIONS

1.0 General Overview

Applying machine-learning to seasonal pattern detection and forecasting presents several technical challenges. One challenge is the ability to automatically detect and compensate for irregularity and variability in seasonal periods. For example, monthly seasons may vary between 28 and 31 days, and yearly seasons may vary between 365 and 366 days. As another example, the first business day of the month may vary depending on weekends and holidays. Many seasonal models assume a fixed seasonal period, denoted L without accounting for potential irregularity.

Another technical challenge is providing a machine-learning solution that is highly flexible and extensible to various types of seasons. A rigid model may be designed to detect a specific type of long-term season, such as a monthly season. However, the types of seasons may be highly variable both in the length of a seasonal period and the irregularity within the seasonal period. The types of long-term seasonal patterns that are present within a given set of time-series data may not be known a priori. Therefore, a rigid, one-size-fits-all model may not be effective in certain applications.

Another technical challenge with machine-learning of variable seasonal patterns is providing a solution that is highly scalable. One approach is to train an explicit model, such as a Holt-Winters model, for each specific type of season. For example, one model may be trained for monthly seasons, another for quarterly seasons, another for bi-annual seasons, etc. The seasonal factors for each model may then be analyzed to determine if there is a season of the specific type associated with the model. This approach would involve a significant amount of processing overhead, especially where a large number of different types of seasons may be present. Dozens or more models may need to be trained, even in cases where only one season is present, which is both computationally expensive and inefficient. In addition, the Holt-Winters models are not tailored to detecting irregularity even for a specific type of season or to detect overlapping seasons, such as long-term seasons overlaid on weekly seasons. As a result, training separate Holt-Winters models for each specific type of season is not highly accurate or scalable.

Techniques herein provide flexible, extensible, and scalable embodiments for machine-learning of variable seasonal patterns. In some embodiments, the techniques include converting one or more parts of a time-series from an observed space to an outlier space. The conversion process may generally include identifying and retaining outlier values. Conversion may facilitate detection of long-term seasonal patterns as these patterns recur infrequently relative to the sampling rate. For example, in a system that monitors resource utilization on an hourly or daily basis, sudden spikes in the utilization metrics may occur on the first Saturday of the month when maintenance operations, such as backups and data integrity checks, are run. As another example, other outlier patterns, such as outlier lows, may recur bi-monthly, monthly, or over some other long-term seasonal period.

Once the outliers are identified, a set of associated timestamps are mapped to one or more encodings of one or more encoding spaces, in accordance with some embodiments. A set of timestamps may identify the dates and times that the outlier values were measured or otherwise observed. An encoding in an encoding space describes where a timestamp is in a specific type of season. For example, a weekly encoding space may encode values based on where the timestamp falls within the day of the week. If the timestamp falls on the second day of the week in the weekly encoding space, then the timestamp may be mapped to an encoding, such as D002, that describes what day of the week the outlier was detected.

In some embodiments, a timestamp may be mapped to multiple encodings of different encoding spaces. Different encodings may be used to describe a timestamp relative to multiple seasons in a season-specific manner and to account for various season-specific irregularities. For example, an outlier with a timestamp of February 21, 2018 may be mapped to the encoding M01-D0021 for a day of the month season, where M01-D0021 represents the $21^{st}$ day of the month within the encoding space. The same timestamp may be mapped to encoding D004-0003 for a day of the week count season, where D004-0003 represents the fourth day of the third week within the encoding space. As another example, the same timestamp may be mapped to encoding M01-D008 in a days remining in the month season, where M01-D008 indicates that the timestamp occurs eight days before the end of the month. Additionally or alternatively, the timestamp may be mapped to one or more encodings in other encoding spaces.

In some embodiments, seasonal patterns are detected based on how frequently outliers are mapped to a particular encoding of an encoding space. For example, if outliers are mapped to M01-D0021 more than a threshold rate, then a seasonal pattern may be detected for the $21^{st}$ day of the month. As another example, outliers may be mapped to mapped to M01-D0021 less than a threshold frequency but to M01-D008 more than a threshold frequency. In this case, a seasonal pattern is detected for a season representing eight days remaining in the month but not for the $21^{st}$ of the month. Thus, the encodings may be used to distinguish between various types of long-terms seasons with varying levels of irregularity.

The techniques for mapping a timestamp to multiple encodings may further allow for different types of seasons to be detected. without needing to train models independently for each type of season. Model training may instead be tailored to the types of seasons where a pattern has been detected. For example, if a seasonal pattern is detected on the first business day of the month, then a corresponding model may be trained to represent the seasonal pattern. Model training may include computing trend and seasonal factors from the outlier values mapped to the corresponding encoding. If no season is detected, then the process of training and generating a representation for the season may be skipped since no seasonal pattern is present. Thus, unnecessary and costly computations may be avoided, allowing for more scalable and efficient modelling of long-term seasonal patterns. At the same time, the encoding spaces maintain flexibility in the types of seasons that may be modelled.

Techniques are further provided herein for forecasting time-series with variable seasonality. In some embodiments, a forecasting model captures different spaces for detected seasons. A space, in this context, indicates how a seasonal pattern was detected and how a forecast should be constructed. For example, one space may be classified as an "observed" or "short-term" space. Another space may be classified as a "long-term" or "outlier" space. The contributions to the forecast may be determined based in part by the space with which the season is associated. For instance, if a forecast is desired at a timestamp in the future, and the timestamp places the forecast in a dense high short-term season and two long-term seasons, then the forecast may include three contributions: one for the dense high short-term season and two for each long-term season.

In some embodiments, the process for generating a forecast includes generating, within volatile or non-volatile memory, a set of data structures that separate sample values by season type and season space. A given season space may be associated with one or more season types. For example, a space for short-term seasons may be associated with dense highs, sparse highs, dense low, and sparse low daily and weekly seasons. As another example, a long-term season space may be associated with high and low patterns in a monthly, bi-monthly, annual, or holiday season. The season types and spaces that are defined may vary from implementation to implementation. A season space may also be associated with values that are unclassified where a seasonal pattern is not detected or where the seasonal pattern was too weak to be classified.

In some embodiments, a data structure for a season space includes a set of clusters of sample values, where the set of clusters represent different season types within the season space. For example, a short-term season space may include a cluster of daily high values and a cluster of daily low values. As another example, a long-term season space may include a cluster of high values and low values for one or more encodings of a long-term season. The clusters in the long-term season space includes patterns of sample values that recur on a long-term basis relative to the patterns represented in the short-term season space. Stated another way, clusters in the long-term season space include patterns that do not fit the short-term season space.

In some embodiments, two or more clusters for a particular season space may be merged together. Merging clusters within a space may lead to more accurate forecasts when a season is associated with too few samples to make a statistically meaningful contribution to a forecast. For example, a long-term season may have less than a threshold number of sample values that were observed, which may raise concerns over the stability of the pattern. The low sample set may be combined with the closest, compatible set until no further combination can be made or there are no low sample sets remaining. The "closest" or "most similar" sample set/ cluster may be calculated relative to other clustered sample sets by comparing the seasonal factors of the season instances represented in the sample collection or by comparing encoding factors of the season instances represented in the cluster. Cluster compatibility may be determined based on the season space. Clusters that belong to different spaces, such as an observed and outlier season space, may be classified as incompatible and prevented from being merged.

In some embodiments, the final cluster set is used to construct a forecast. The forecast may be generated in part by trending patterns for each merged and/or unmerged cluster in the final cluster set. Independently trending different cluster sets allows for a more robust machine-learning analytic that may account for the impact of multiple seasonal patterns. Further, this approach allows for a more nuanced analysis. For example, the analytic may trend over different durations depending on the space of the seasons. The process of merging the closest/most similar clusters may be used to contain the total number of clusters that are independently trended, allowing for a more compute-efficient and scalable solution.

In some embodiments, the techniques described herein are used to perform one or more management operations on one or more computing resources. For example, a generated forecast may be used to perform capacity planning, job scheduling, or maintenance planning operations. As another example, baseline models may be trained to perform anomaly detection operations or optimize system configurations in a seasonal-aware manner.

Embodiments may be implemented independently from or in combination with other embodiments described herein. For example, the techniques for automatically detecting long-term seasons via encodings may be leveraged to forecast time-series with variable seasonality. In other cases, the techniques for forecasting time-series with variable seasonality may be performed without the use of these techniques. For example, the forecasting analytic may be constructed to process user-created synthetic seasons to allow for simulations and what-if analytics rather than relying on machine-learning of long term seasonal patterns. Further, the techniques for automatically detecting long term seasons may be used for anomaly detection, troubleshooting, reporting, or other applications that do not require the generation of a forecast.

One or more embodiments described in this Specification and/or recited in the claims may not be included in this General Overview section.

2.0 System Architecture

A time series signal comprises a sequence of values that are captured over time. The source of the time series data and the type of information that is captured may vary from implementation to implementation. For example, a time series may be collected from one or more software and/or hardware resources and capture various performance attributes of the computing resources from which the data was collected. As another example, a time series may be collected using one or more sensors that measure physical properties, such as temperature, pressure, motion, traffic flow, physiological metrics or other attributes of an object or environment.

FIG. 1 illustrates example system 100 for learning seasonal patterns and performing seasonal-aware operations, in accordance with some embodiments. System 100 generally comprises hosts 110a-n, data collector 120, analytic services 130, data repository 140, and clients 150a-k. The components illustrated in FIG. 1 may be implemented in software and/or hardware. Each component may be distributed over multiple applications and/or machines. Multiple components may be combined into one application and/or machine. Operations described with respect to one component may instead be performed by another component.

Hosts 110a-n represent a set of one or more network hosts and generally comprise targets 112a-i and agents 114a-j. A "target" in this context refers to a resource that serves as a source of time series data. For example, a target may be a software deployment such as a database server instance, middleware instance, or some other software resource executing on a network host. In addition or alternatively, a target may be a hardware resource, an environmental characteristic, or some other physical resource for which metrics may be measured and tracked.

Agents 114a-j comprise hardware and/or software logic for capturing time-series measurements from a corresponding target (or set of targets) and sending these metrics to data collector 120. In one or more embodiments, an agent includes a process, such as a service or daemon, that executes on a corresponding host machine and monitors one or more software and/or hardware resources that have been deployed. In addition or alternatively, an agent may include one or more hardware sensors, such as microelectromechanical (MEMs) accelerometers, thermometers, pressure sensors, heart rate monitors, etc., that capture time-series measurements of a physical environment and/or resource. Although only one agent and target is illustrated per host in FIG. 1, the number of agents and/or targets per host may vary from implementation to implementation. Multiple agents may be installed on a given host to monitor different target sources of time series data. In other cases, a single agent may monitor multiple resources locally on the same host or remotely across multiple hosts.

Data collector 120 includes logic for aggregating data captured by agents 114a-j into a set of one or more time-series. Data collector 120 may store the time series data in data repository 140 and/or provide the time-series data to analytic services 130. In one or more embodiments, data collector 120 receives data from agents 114a-j over one or more data communication networks, such as the Internet. Example communication protocols that may be used to transport data between the components illustrated within system 100 may include, without limitation, the hypertext transfer protocol (HTTP), simple network management protocol (SNMP), and other communication protocols of the internet protocol (IP) suite.

Data collector 120 may collect or generate timestamps for sample values in a time-series. A timestamp for a sample value indicates the date and time at which the sample value was measured or otherwise observed. For example, CPU performance on a target host that is sampled every five minutes may have a sequence of timestamps as follows for the collected samples: August 16, 11:50 p.m., August 16, 11:55 p.m., August 17, 12:00 a.m., and August 17, 12:05 a.m. The sampling rate and manner in which the timestamp is encoded may vary from implementation to implementation.

Analytic services 130 include a set of analytics that may be invoked to process time-series data. Analytic services 130 may be executed by one or more of hosts 110a-n or by one or more separate hosts, such as a server appliance that is operated independently from the managed hosts. One or more of analytic services 130 may be integrated into a network service, such as a software-as-a-service (SaaS), web service, or other cloud service. Analytic services 130 comprises seasonality analytic 132, forecasting analytic 134, management analytic 136, and frontend interface 138. Each analytic implements a function or set of functions for receiving a set of inputs, such as the collected time-series data, and outputting a set of one or more analytic results. The services included in analytic services 130 may vary from implementation to implementation. Analytic services 130 may include one or more additional services and/or may omit one or more of the depicted services. For example, analytic services 130 may include a state change analytic such as described in U.S. application Ser. No. 15/266,979, now U.S. Pat. No. 10,970,891, entitled "SYSTEMS AND METHODS FOR DETECTING AND ACCOMMODATING STATE CHANGES IN MODEELING", previously incorporated by reference.

Seasonality analytic 132 includes logic for detecting and classifying seasonal behaviors within an input time-series signal. In some embodiments, seasonality analytic 131 may generate seasonal patterns that approximate detected seasonal behavior within a time-series and/or classify seasonal patterns/behaviors according to techniques described in U.S. application Ser. No. 15/140,358, now U.S. Pat. No. 10,073,906, entitled "SCALABLE TRI-POINT ARBITRATION AND CLUSTERING"; U.S. application Ser. No. 15/057,065, now U.S. Pat. No. 10,331,802, entitled "SYSTEM FOR DETECTING AND CHARACTERIZING SEASONS"; U.S. application Ser. No. 15/057,060, now U.S. Pat. No. 10,699,211, entitled "SUPERVISED METHOD FOR CLASSIFYING SEASONAL PATTERNS"; and/or U.S. application Ser. No. 15/057,062, now U.S. Pat. No. 10,885,461, entitled "UNSUPERVISED METHOD FOR CLASSIFYING SEASONAL PATTERNS", the entire contents for each of which were previously incorporated by reference herein as if set forth in their entirety. For instance, seasonality analytic 131 may identify and classify sparse highs, dense highs, sparse lows, and/or dense lows that are seasonal within an input set of time-series data. Additionally or alternatively, seasonality analytic 131 may implement techniques for automatically detecting and classifying long-term seasons as described further herein.

Forecasting analytic 134 includes logic for training forecasting models and generating forecasts based on the trained forecasting models. In some embodiments, the forecasts that are generated account for seasonal patterns, if any, that are detected by seasonality analytic 132 and state changes that are detected, if any. The forecasting model that is implemented by forecasting analytic 134 may vary depending on the particular implementation. In one or more embodiments, forecasting analytic 134 may implement a forecasting model such as described in U.S. application Ser. No. 15/266,971, entitled "SEASONAL AWARE METHOD FOR FORECASTING AND CAPACITY PLANNING"; and/or U.S. application Ser. No. 15/266,987, now U.S. Pat. No. 10,867,421, entitled "SYSTEMS AND METHODS FOR TRENDING PATTERNS WITHIN TIME-SERIES DATA", the entire contents for each of which were previously incorporated by reference herein as if set forth in their entirety. The forecasting models are trained based on the detected seasonal patterns in an input time-series signal and used to project future values for the time-series signal. In other embodiments, the techniques described herein may be applied to generate forecasts.

Management service 136 includes logic for performing and/or recommending seasons-aware operations. For example, management service 136 may automatically deploy additional software resources on one or more hosts to satisfy forecasted demands on system 100. As another example, management service 136 may generate and display a recommendation to acquire additional hardware resources to satisfy a forecasted increase in demand. In yet another example, management service 136 may automatically bring down deployed resources during forecasted low seasons to conserve energy/resources. Thus, seasonal-aware operations may leverage the generated forecasts to increase the efficiency at which resources are deployed within a datacenter or cloud environment.

Frontend interface 138 allows clients 150*a-k* and/or other system components to invoke analytic services 130. Frontend interface 138 may render user interface elements and receive input via user interface elements. Examples of interfaces include a graphical user interface (GUI), a command line interface (CLI), a haptic interface, a voice command interface, and an application programming interface (API). Examples of user interface elements include checkboxes, radio buttons, dropdown lists, list boxes, buttons, toggles, text fields, date and time selectors, command lines, sliders, pages, and forms.

Data repository 140 includes volatile and/or non-volatile storage for storing data that is generated and/or used by analytic services 130. Example data that may be stored may include, without limitation, time-series data collected by data collector 130, seasonal pattern classifications generated by seasonality analytic 132, forecast data generated by forecasting analytic 134, and capacity planning actions/recommendations generated by management service 136. Data repository 140 may reside on a different host machine, such as a storage server that is physically separate from analytic services 130, or may be allocated from volatile or non-volatile storage on the same host machine.

Clients 150*a* to 150*k* represent one or more clients that may access analytic services 130 to generate forecasts and/or perform capacity planning operations. A "client" in this context may be a human user, such as an administrator, a client program, or some other application instance. A client may execute locally on the same host as analytic services 130 or may execute on a different machine. If executing on a different machine, the client may communicate with analytic services 130 via one or more data communication protocols according to a client-server model, such as by submitting HTTP requests invoking one or more of the services and receiving HTTP responses comprising results generated by one or more of the services.

Additional embodiments and/or examples relating to computer networks are described below in Section 6.0, entitled "Computer Networks and Cloud Networks."

Components of system 100 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3.0 Machine-Learning Techniques for Detecting Long-Term Seasons

In some embodiments, seasonality analytic 132 is configured to learn, characterize, and model long-term seasons from an input set of time-series data. Seasonality analytic 132 may learn and model long-term seasons of varying types, lengths, and irregularities without training several different models, allowing for a more scalable and computationally efficient approach. The process of learning and characterizing long-term seasons may include, but is not limited to, converting the time-series to an outlier space, counting the outliers in season-specific encoding spaces where a single timestamp may be mapped to one or more encodings, analyzing the outlier counts relative to the opportunity counts to determine the likelihood that a specific seasons is present, and iteratively accounting for observed outliers by an ensemble of specific seasons to determine the final set of long-term seasons detected in the input set of time-series.

A seasonal period of a "long-term" season may vary from implementation to implementation. For example, in some cases, a weekly season may be long-term relative to a daily season. In other cases, a weekly season may represent a short-term season whereas a monthly season may be classified as a long-term season. As explained in further detail below, determining whether a season is long-term or short-term may be determined, based in part, by analyzing time-series data in the outlier space.

Figure 2:
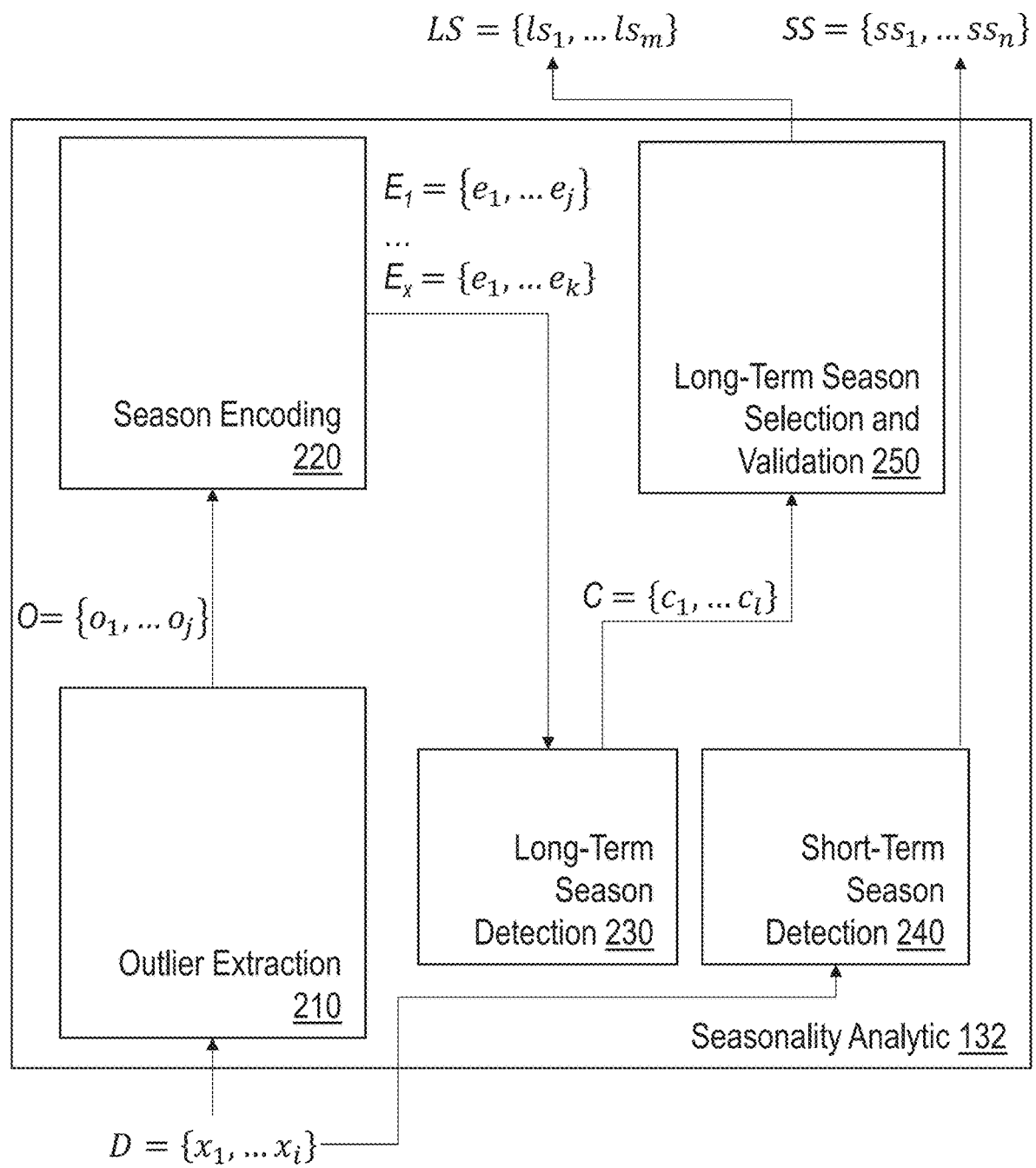
FIG. 2 illustrates an example data flow diagram for a seasonality analytic in accordance with some embodiments.

FIG. 2 illustrates an example data flow diagram for seasonality analytic 132 in accordance with some embodiments. Outlier extraction block 210 receives a time-series dataset D, which includes a set of data points $\{x_1, \ldots, x_i\}$ representing metric values measured or otherwise observed over time. Outlier extraction block 210 converts time-series dataset D to the outlier space. Outlier extraction block 210 outputs outlier dataset O, which includes a set of outlier values $\{o_1, \ldots, o_j\}$. The outlier values may comprise a subset of data points D that have been classified as outliers during the conversion process.

Season encoding block 220 receives outlier dataset O and maps each outlier value to one or more encodings of an encoding space. In response, season encoding block 220 outputs a set of encodings for one or more encoding spaces, denoted $E_1$ to $E_x$. An encoding space may have zero or more encodings depending on how many timestamps in the set of outlier values may be mapped to encodings of the encoding space.

Long-term season detection block 230 receives the set of encodings and outputs a set of candidate long-term seasons C. In some embodiments, the set of candidate long-term season values $\{c_1, \ldots, c_l\}$ includes a season encoding representing a detected season. For example, the season encoding D365 may represent the $365^{th}$ day of the year as a candidate season. As another example, the encoding M01D02 may represent the $2^{nd}$ day of every month as a candidate season. The season encodings may be selected based on relative frequency with which the encodings occur in $E_1$ to $E_x$. The relative frequency may be computed as the number of times an encoding is included in an encoding space relative to the number of opportunities to observe the encoding as described in further detail below.

Long-term season selection and validation block 250 receives the candidate set of seasons C and outputs a set of one or more selected long-term seasons LS. In some cases, one or more of candidate seasons $\{c_1, \ldots, c_l\}$ may overlap. For example, one candidate season may be a Day of the Month season for a one-month duration. Another candidate season may be Day of the Month seasons for two and three-month durations. To address the overlap, long-term season selection and validation block 250 may remove seasons that fail to explain a sufficient amount of the encodings. The set of values $\{ls_1, \ldots ls_m\}$ may thus include a subset of the season encodings from candidate set C.

In some embodiments, seasonality analytic 132 includes short-term season detection block 240, which receive time-series dataset D and outputs a set of short-term seasons denoted SS. For example, short-term season detection block 240 may implement the techniques described in U.S. application Ser. No. 15/057,065, now U.S. Pat. No. 10,331,802, entitled "SYSTEM FOR DETECTING AND CHARACTERIZING SEASONS"; U.S. application Ser. No. 15/057,060, now U.S. Pat. No. 10,699,211, entitled "SUPERVISED METHOD FOR CLASSIFYING SEASONAL PATTERNS"; and/or U.S. application Ser. No. 15/057,062, now U.S. Pat. No. 10,885,461, entitled "UNSUPERVISED METHOD FOR CLASSIFYING SEASONAL PATTERNS", the entire contents for each of which were previously incorporated by reference herein as if set forth in their entirety, to detect and characterize short-term seasons. However, other techniques, such as Holt-Winters and other seasonal models may also be used, or short-term season detection may be omitted, depending on the particular implementation.

Figure 3:
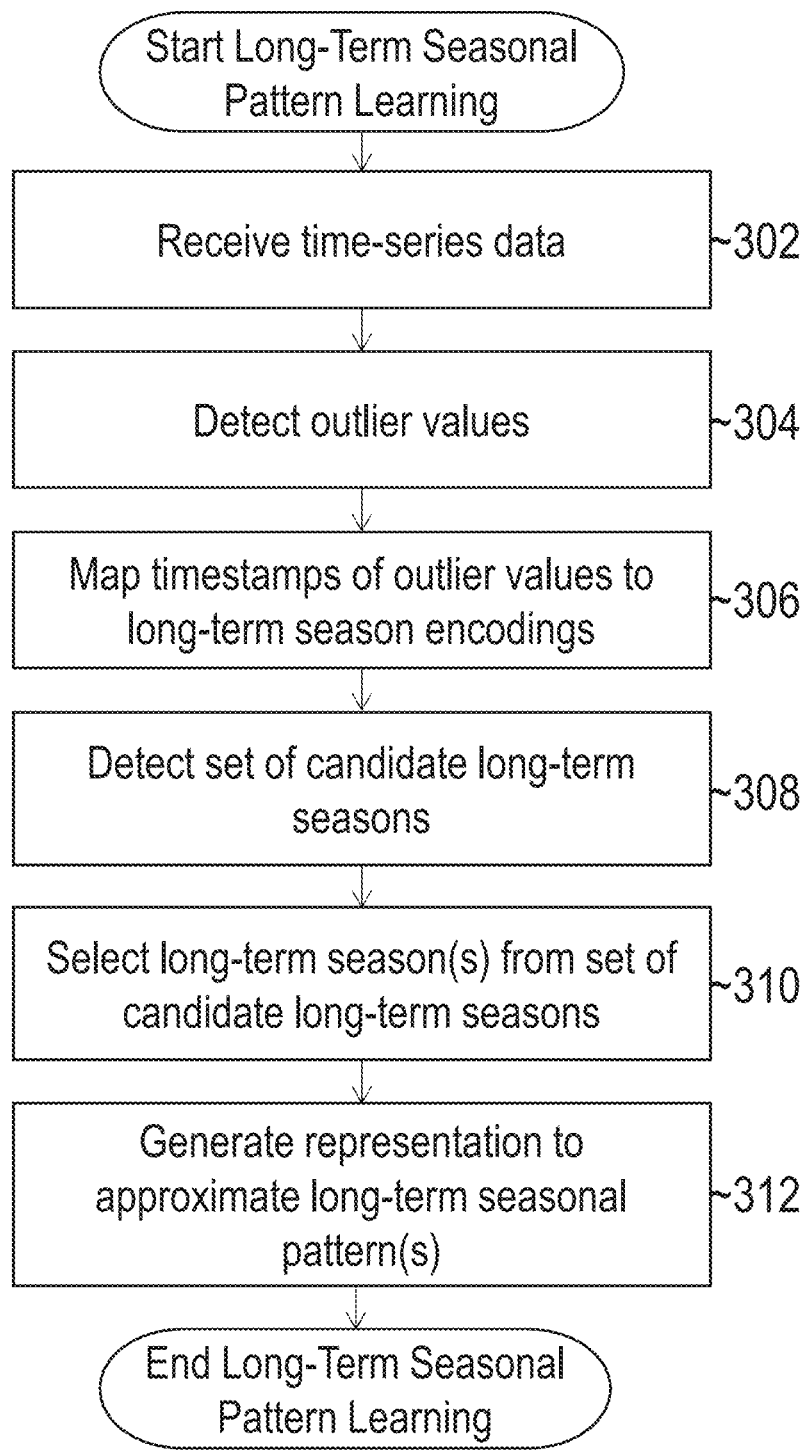
FIG. 3 illustrates an example set of operations for learning long-term seasonal patterns in accordance with some embodiments.

FIG. 3 illustrates an example set of operations for learning long-term seasonal patterns in accordance with some embodiments. The set of operations includes receiving a set of time-series data. (operation 302). In some embodiments, this operation includes collecting the time-series data from one or more target resources, such as previously described. In other embodiments, the time-series data may be submitted by a user or separate application. For example, the user of a cloud service may submit a file including the time-series data via a web interface or through a cloud storage drive.

Responsive to receiving the set of time-series data, seasonality analytic 132 detects a set of outlier values (operation 304). An outlier value is a value that differs in a statistically significant manner from other values in the time-series data set. Techniques for automatically identifying outlier values are described further below in Section 3.1, titled "Converting Time-Series Data to the Outlier Space".

Once the outlier values have been identified, seasonality analytic 132 maps timestamps associated with the outlier values to long-term season encodings (operation 306). For example, a timestamp associated with an outlier may indicate that the value was observed on February 24, 2018. The timestamp may be mapped to several potential different encodings, such as M01-D24, representing the $24^{th}$ day of a monthly season, M02-D24, representing the $24^{th}$ day of every other month, W008-D06 representing the $6^{th}$ day of the $8^{th}$ week of the year, D055 representing the $55^{th}$ day of the year, M01-D004 representing four days remaining in the month on a monthly basis, and M02-D004 representing four days remining in the month on a every other month basis. Additionally or alternatively the timestamp may be mapped to encodings of other encoding spaces. Additional examples are provided below in Section 3.2, titled "Encodings for Candidate Season Detection" and Section 3.3 titled "Handling Ambiguous Seasons". The mapping may be performed for each outlier value from the time-series data that was retained during the conversion to the outlier space.

Based on the mappings, seasonality analytic 134 detects a set of candidate long-term seasons (operation 308). In some embodiments, seasonality analytic 134 selects a season as a candidate if the relative frequency of encodings for the season exceeds a threshold. For example, an encoding may be classified as a candidate season if the encoding is detected 60% of the available opportunities for the encoding to occur. Other thresholds may also be used, depending on the particular implementation. The thresholds may vary from implementation to implementation and may be configurable by a user.

Seasonality analytic 134 further selects long-term seasons from the set of candidate long-term seasons (operation 310). As previously noted, the final set of long-term seasons may include a subset of the candidate set of seasons. For example, overlapping seasons may be merged or removed based on which season describes the greatest amount of outlier values. Techniques for selecting long-term seasons are described further below in Section 3.4, titled "Selecting and Representing Seasonal Patterns". In other embodiments, operation 310 may be omitted, and/or the entire set of candidate long-term seasons may be used as the final set of seasons.

Once the long-term seasons have been identified, seasonality analytic 134 generates a representation to approximate the long-term seasonal patterns (operation 312). In some embodiments, seasonality analytic 134 trains one or more models for the detected seasons. For example, analytic services 130 may train Holt-Winters models, variable seasonality forecasting models described further below, and/or other seasonal models. In this scenario, the parameters for training the models may be set based on the final set of long-term seasons that were selected. For example, the seasonal duration, irregularity, and outlier values may be used to determine the seasonal factors/contributions of a long-term season. Also, model training does not need to occur for season types that are not included in the final set. Thus, the approach is much more scalable then training several different models to account for each type of season that may be present. At the same time, the approach allows for flexibility via the encoding spaces, as several different types of seasons may be learned and modelled.

3.1 Converting Time-Series Data to the Outlier Space

Long-term seasons may be characterized as behavior that recurs infrequently relative to the sampling rate or a short-term timeframe. For example, a sudden spike in metric values may be observed on a bimonthly, monthly, or yearly basis for a time-series that samples values on an hourly or daily basis. Thus, isolating and analyzing outlier values from the time-series may facilitate identification of long-term seasonal patterns.

In order to isolate outlier values, outlier extraction block 210 may be configured to convert an input set of time-series data to the outlier space. The conversion process may generally comprise identifying data points within the set of time-series that differ in by a statistically significant amount from other data points. Statistical significance may be determined based on variance, standard deviations, z-scores, maximum concentration intervals (MCI), probability distribution functions (PDFs), cumulative distribution functions (CDFs) or some combination thereof, depending on the particular implementation.

Outlier extraction block 210 may be configured to account for short-term seasonal patterns, if any, when converting a time-series to the outlier space. Accounting for short-term seasonal patterns reduces the chance of flagging short-term seasonal spikes or dips as outliers. For example, resource utilization may spike at a certain hour every day. The daily highs may be outliers relative to a median value for the time-series. However, the values follow a short-term seasonal pattern as they recur frequently. Thus, outlier extraction block 210 may account for such short-term patterns to avoid flagging these values as outliers. On the other hand, if the values are detected at a time of day where the values are infrequently detected, then outlier extraction block 210 may flag the values as outliers.

Figure 4:
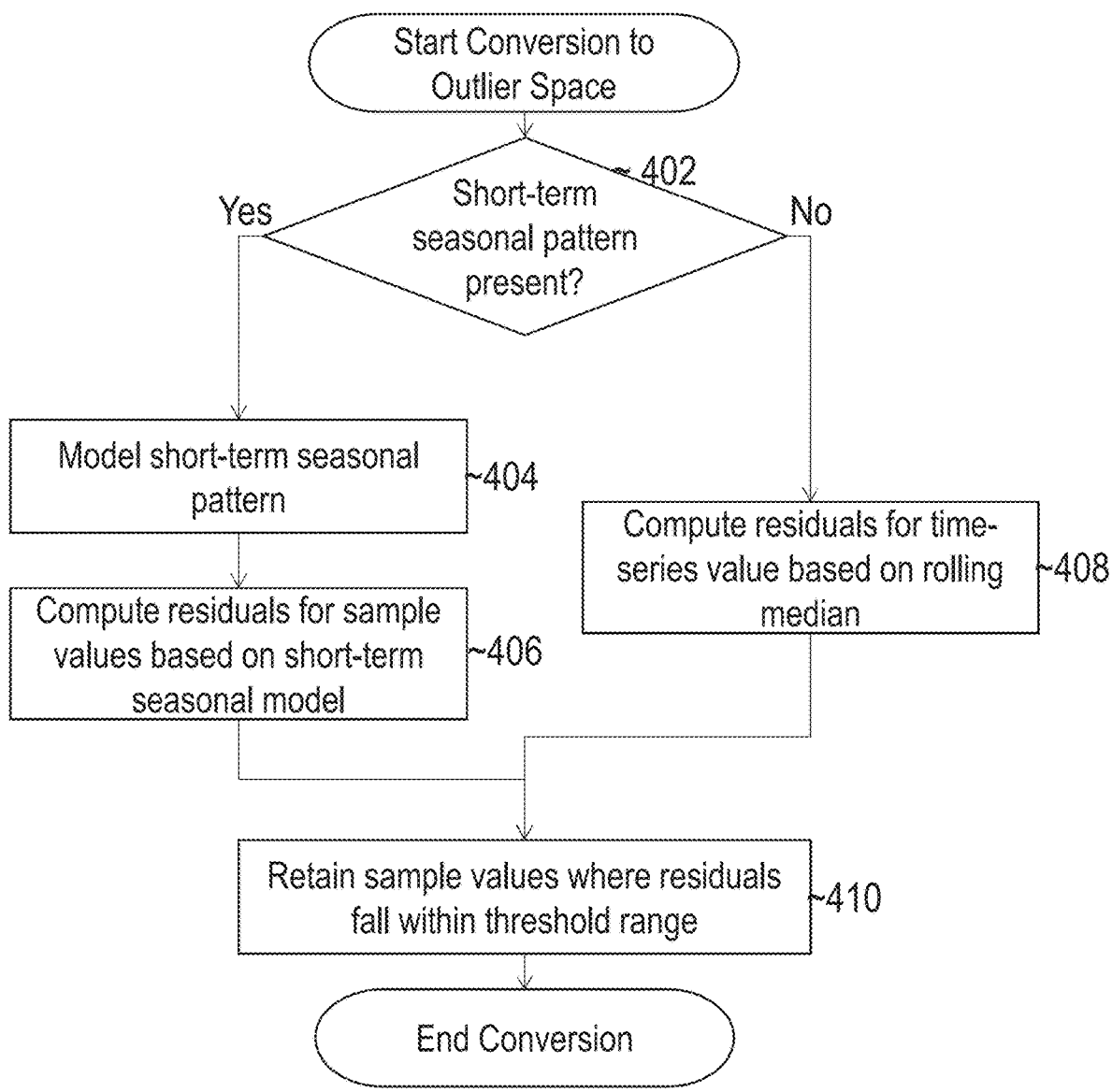
FIG. 4 illustrates an example set of operations for converting an input time-series to an outlier space in accordance with some embodiments.

FIG. 4 illustrates an example set of operations for converting an input time-series to an outlier space in accordance with some embodiments. The set of operations includes determining whether short-term seasonal pattern is present within the time-series data (operation 402). The seasonal period for a "short-term" season may vary from implementation to implementation. For example, the time-series data may be analyzed for hourly, daily, and/or weekly seasons in some embodiments. In other embodiments, weekly seasons may be processed as long-term seasons.

If a short-term seasonal pattern is detected, then seasonality analytic 132 trains a model representing the pattern (operation 404). Techniques for automatically training and modelling short-term seasons are described in U.S. application Ser. No. 15/057,065, now U.S. Pat. No. 10,331,802, entitled "SYSTEM FOR DETECTING AND CHARACTERIZING SEASONS"; U.S. application Ser. No. 15/057,060, now U.S. Pat. No. 10,699,211, entitled "SUPERVISED METHOD FOR CLASSIFYING SEASONAL PATTERNS"; and/or U.S. application Ser. No. 15/057,062, now U.S. Pat. No. 10,885,461, entitled "UNSUPERVISED METHOD FOR CLASSIFYING SEASONAL PATTERNS", the entire contents for each of which were previously incorporated by reference herein as if set forth in their entirety.

If a short-term season is present, then seasonality analytic 132 computes residuals for sample values based on the trained short-term seasonal model (operation 406). A residual may be computed as the difference between the value expected for a particular point in time and the observed value. For example, for a weekly high season, CPU utilization may be expected to be at 80% per the trained model. An observed value for the weekly high season in the input time-series may be 90% utilization. The residual in the case may be computed to be 10%. In a weekly low season, the CPU utilization may be expected to be at 30%. If the observed value is 90% in this case, then the residual would be 60%. As can be seen, the residual value may vary depending on the season the observed value is in when a short-term season is present.

If a short-term season is not present, then seasonality analytic 132 computes residuals for the time-series value based on a rolling median (operation 408). The length of the rolling median window may vary depending on the particular implementation. For example, a monthly median filter may be applied to compute the median value for the most recent month of time-series data. The median value may then be compared to sample values in the input time-series data to determine the residual value. The residual in this case is not season-dependent since no short-term seasons were detected and no short-term seasonal model was trained.

Once the residuals have been calculated, seasonality analytic 132 retains the sample values where the residuals fall within a threshold range (operation 410). The retained values represent the outliers from the input time-series. The threshold that is used may vary from implementation to implementation. In some embodiments, this operation includes computing the 90% maximum concentration interval. Techniques for computing the maximum concentration interval are described in U.S. application Ser. No. 15/057,065, now U.S. Pat. No. 10,069,900, entitled "SYSTEMS AND METHODS FOR ADAPTIVE THRESHOLDING USING MAXIMUM CONCENTRATION INTERVALS", which was previously incorporated by reference. Residual samples with values above the upper 90% limit (or other threshold) may be classified as outliers and retained for modelling long-term seasons in the input time-series.

3.2 Encodings for Candidate Season Detection

Once the outlier values have been identified, seasonality analytic 132 may use encodings to determine whether outliers within a set of candidate seasons occur with regularity. By mapping an observed timestamp to an encoding or set of encodings for each specific candidate season, seasonality analytic may detect long-term seasons by searching for encodings that are most commonly observed to be outliers. Put another way, when outliers are observed, their respective timestamps may receive a set of one or more encodings from specific seasons.

By narrowing the focus on processing around a specific season within the encoding space, the approach may be implemented with relatively low compute overhead and is easily extensible.

Figure 5:
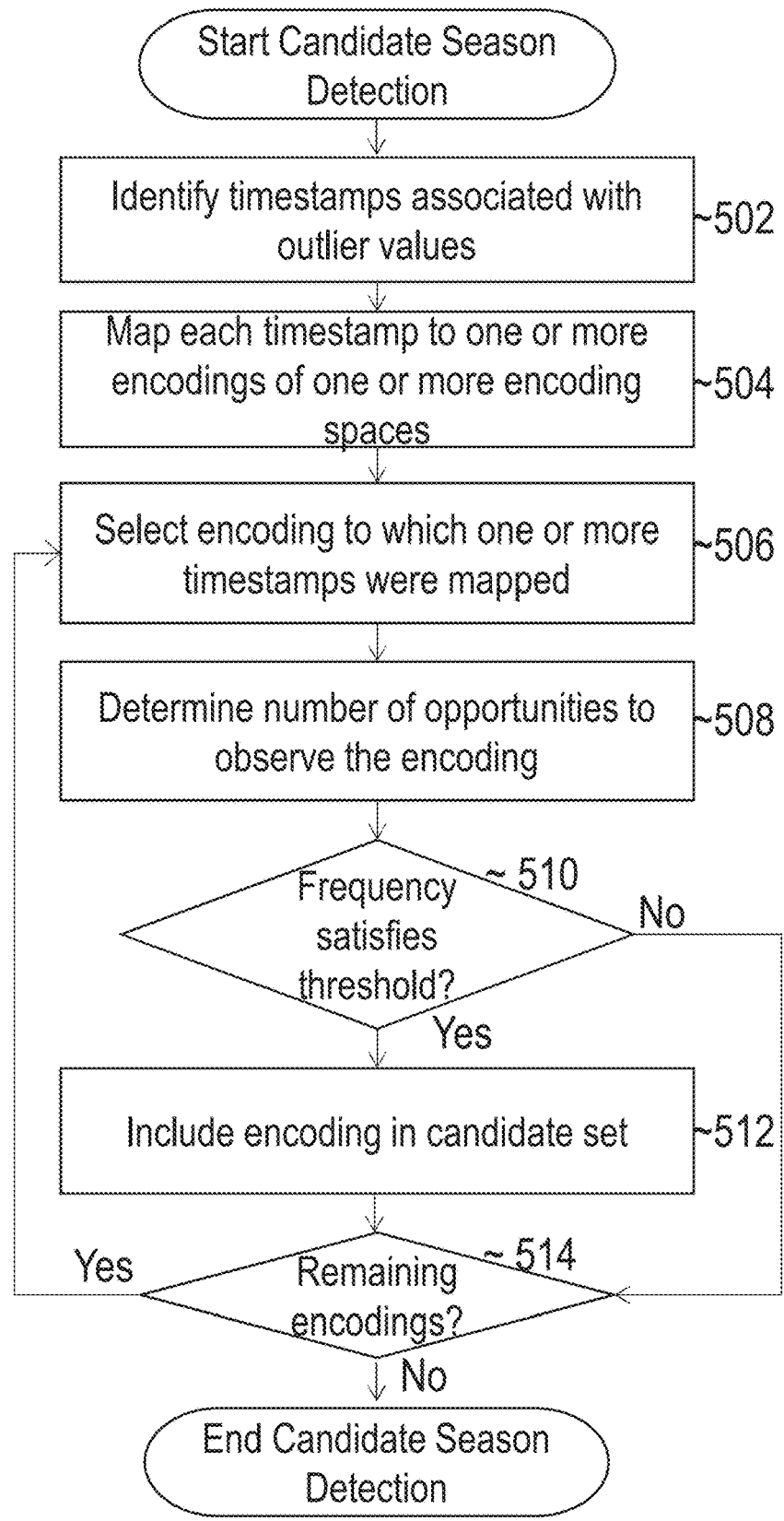
FIG. 5 illustrates an example set of operations for detecting candidate seasons based on a set of encodings in accordance with some embodiments.

FIG. 5 illustrates an example set of operations for detecting candidate seasons based on a set of encodings in accordance with some embodiments. The set of operations includes identifying timestamps associated with outlier values retained during the conversion process (operation 502). The timestamp for an outlier value may identify a time at which the outlier value was measured or otherwise observed. For example, a timestamp may identify a date (e.g., day, month year) and time (e.g., second, minute, hour) that a metric value was measured.

In some embodiments, seasonality analytic 132 maps each timestamp to one or more encodings within one or more encoding spaces. (operation 504). An encoding describes where a timestamp is in a specific type of season. Encodings from different encoding spaces may follow different season-specific formats. For example, as previously mentioned, a timestamp associated with an outlier may indicate that the value was observed on February 24, 2018. The timestamp may be mapped to several different encodings for candidate seasons, such as M01-D24, representing the $24^{th}$ day of a monthly season, M02-D24, representing the $24^{th}$ day of every other month, W008-D06 to represent the $8^{th}$ week of the year, and $6^{th}$ day of the week, D055 to represent the $55^{th}$ day of the year, M01-D004 representing four days remaining in the month on a monthly basis, and M02-D004 representing four days remining in the month on a every other month basis. Other example encodings are presented below, and the format and encodings that are mapped during this operation may vary from implementation to implementation. The mapping process may be repeated for each outlier timestamp.

Once the set of encodings have been generated, seasonality analytic 132 selects a unique encoding to which one or more of the timestamps were mapped (operation 506). In the previous example, M01-D24, M02-D24, W008-D06, D055, M01-D004, M02-D004 represent unique encodings for a single timestamp. Additionally or alternatively, other unique encodings may be generated for the same timestamp and/or for different timestamps. Other timestamps may also be mapped to the same encoding. For example, an outlier value detected on March 24, 2018 may be mapped to M01-D24 encoding as it is the $24^{th}$ day of the month. However, March 24 would be mapped to different encodings for the other encoding spaces. For instance, the encoding for days remaining in the month would be mapped to M01-D007 as there are 31 days in March.

Seasonality analytic 132 next determines the count of the unique encoding relative to the number of opportunities to observe the encoding (operation 508). In some embodiments, the number of opportunities to observe an encoding differs between different encoding spaces. For example, if the time-series includes six months of data, and an encoding in a monthly encoding space is observed five times, then the relative frequency may be represented as 5/6. An encoding for an every-other-month encoding space has three opportunities in the same timeframe. If two encodings are observed in the same timeframe, then the relative frequency is 2/3.

In some embodiments, seasonality analytic 132 determines whether the relative frequency of an encoding satisfies a threshold (operation 510). If the relative frequency satisfies a threshold, then seasonality analytic includes the encoding in a candidate set (operation 512). In this case, the encoding recurred frequently enough (e.g., more than 0.6 or some other threshold) to be representative of a long-term season.

If the relative frequency of an encoding does not satisfy the threshold, then the encoding does not recur frequently enough to represent a long-term season. Therefore, the encoding is not included in the candidate set. Once the determination has been made whether or not to include the encoding, seasonality analytic 132 determines whether there are any remaining unique encodings to analyze (operation 514). If there are any remaining unique encodings, then the process returns to operation 506, and the newly selected encoding is analyzed. Once all unique encodings have been processed, the process ends. The final candidate sets may thus include all unique encodings that satisfy the frequency threshold.

In some cases, a minimum count threshold may be used in addition or as an alternative to the relative frequency threshold. For example, if an encoding is observed less than three times or some other threshold number, then the encoding may be excluded from the candidate set. A minimum count may be used to prevent encodings from being added before enough opportunities have arisen to establish a recurrent, long-term seasonal pattern.

As previously mentioned, several different encoding spaces and/or formats may be defined. FIG. 6 illustrates an example set of encodings for candidate seasons in accordance with some embodiments. Table 600 defines various attributes for a set of encodings, including encoding space 602, variations 604, examples 606, and encodings 608. Encoding space 602 identifies the types of seasons that may be represented by encodings within the space. Example encoding spaces/season types may include, but are not limited to, day of the week, day of the bi-week, day of the month, days remaining count, day of the week count, days of week remaining count, day of week in week count, day of week in remaining week count, business day count, business days remaining count, weekend day count, weekend days remaining, business day before adjusted day of month, business day after adjusted day of month, weekend day before adjusted day of month, weekend day after adjusted day of month, day of year, holidays and events, and days before holiday count.

An encoding space may be associated with different variations. For example, an encoding space for day of the month may support variations between one and three months. In the one-month variation, the same encoding may be applied to the same day every month. For example, January 15 and February 15 may both be assigned the encoding M01-D015. In the two-month variation, these timestamps may be mapped to different encodings. For example, January 15 may be assigned the encoding M01-D015 and February 15 may be assigned the encoding M02-D015. Examples 606 of table 600 provide an example candidate seasons for each encoding space. The corresponding encodings 608 are also illustrated in table 600.

In some embodiments, the encoding spaces and season types are configurable by an end user. For example, a user may select a subset of season types corresponding to encoding spaces 602. In response, timestamps for the outlier values may be mapped only to encodings within the selected encoding spaces. This approach may limit the number of encodings that are generated and allows the user to focus the analysis on seasons of interest.

In some embodiments, users may define new encoding spaces. For example, a user may define a custom seasonal period of n days, weeks, months, or years where n is a positive integer. The user may further specify how to track and encode count values within the seasonal period. For example, the encoding may represent a day, week or month count. As another example, a count may represent days remaining in the seasonal period, weeks remaining in the seasonal period, or months remaining in the seasonal period. Thus, encoding spaces may be customizable, allowing for greater flexibility and extensibility.

3.3 Handling Ambiguous Seasons

As previously described, a timestamp may be mapped to one or more timestamps across one or more long-term seasons. In some embodiments, seasonality analytic 132 generates one-to-one timestamp-to-encoding mapping for a given long-term season to which a timestamp is mapped. In this case, there may be a one-to-many timestamp-to-encoding mapping across multiple long-term seasons, but an individual long-term season may have a one-to-one mapping. For example, a timestamp of January 31, 2018 may be mapped to the encoding D004-0005 (representing the $5^{th}$ Wednesday) in the Day of Week Count in a one-month season. The one-to-one mapping allows detection of the long-term season in the Day of Week Count encoding space may counting outliers that have the D004-0005 encoding versus the number of opportunities to observe the encoding. Classification of the long-term season may be performed by determining if D004-0005 is one of the encodings with a detected season. The January 31, 2018 timestamp may be mapped in a one-to-one mapping for other candidate long-term seasons.

In some embodiments, a given season may support one-to-many timestamp-to-encoding mappings. This technique may be useful for ambiguous seasons where a direct encoding schema may be difficult. For example, a candidate long-term season may be one-month in the business day before adjusted day of month encoding space. In this example, the last business day may fall on the $15^{th}$ or, if the $15^{th}$ is on a weekend, then the $13^{th}$ or $14^{th}$ of the month. To accommodate ambiguities, timestamps may be mapped to multiple monthly encodings. For example, the timestamp April 13, 2018 is a Friday, which is the last business day before April 15, 2018. The timestamp may initially be mapped to the encoding M01-D013. The encoding may be incremented by to M01-D015 since the $15^{th}$ falls on a weekend. Similarly, timestamps mapped to D014 may be incremented to D015 if the $15^{th}$ falls on a weekend.

In some embodiments, multiple encodings contribute to relative frequency counts during candidate season detection. For instance, D013, D014, and D015 may contribute to the same relative frequency count for the one-month season in the business day before adjusted day of month encoding space. The threshold may thus correspond to the frequency of a range of encodings rather than a single encoding to account for ambiguities in a season.

3.4 Selecting and Representing Seasonal Patterns

In some embodiments, the set of candidate seasons may include seasons that overlap or are composites of one another. One example is if seasonality analytic 132 detects a possible Day of Month season for a one-month duration, then seasonality analytic 132 may also detect possible Day of Month seasons of duration two and three months. Seasonality analytic 132 may reconcile overlapping and/or composite seasons before returning the final set of detected long-term seasons.

In some embodiments, a set of rules may be defined for reconciling overlapping and/or composite seasons. The rules approach may compare relative frequencies to threshold and/or implement other logic to merge or otherwise select between such seasons. For example, a rule may be defined such that a season of a shorter duration is selected if the relative frequency is within a threshold range of a season of a longer duration for which the season is a composite. For instance, if the relative frequency of a monthly season on the $24^{th}$ is 0.8, and the relative frequency for a two-month duration is 0.82, then the monthly season explains almost as many of the outliers as the two-month season and may be selected. On the other hand, if the monthly season is significantly lower, such as 0.6, then the two-month duration may be selected.

In some embodiments, the rules-based approach to reconciling seasons may be too brittle when there are a significant number of specific seasons. Another approach is to rank seasons by their respective complexity and duration. Seasonality analytic 132 may then collect the outliers that are accounted for by each of the seasons in their respective order. In this way, seasonality analytic 132 may determine how much of the discovered outliers are explained by each season and remove any seasons that do not explain a sufficient amount.

Figure 7:
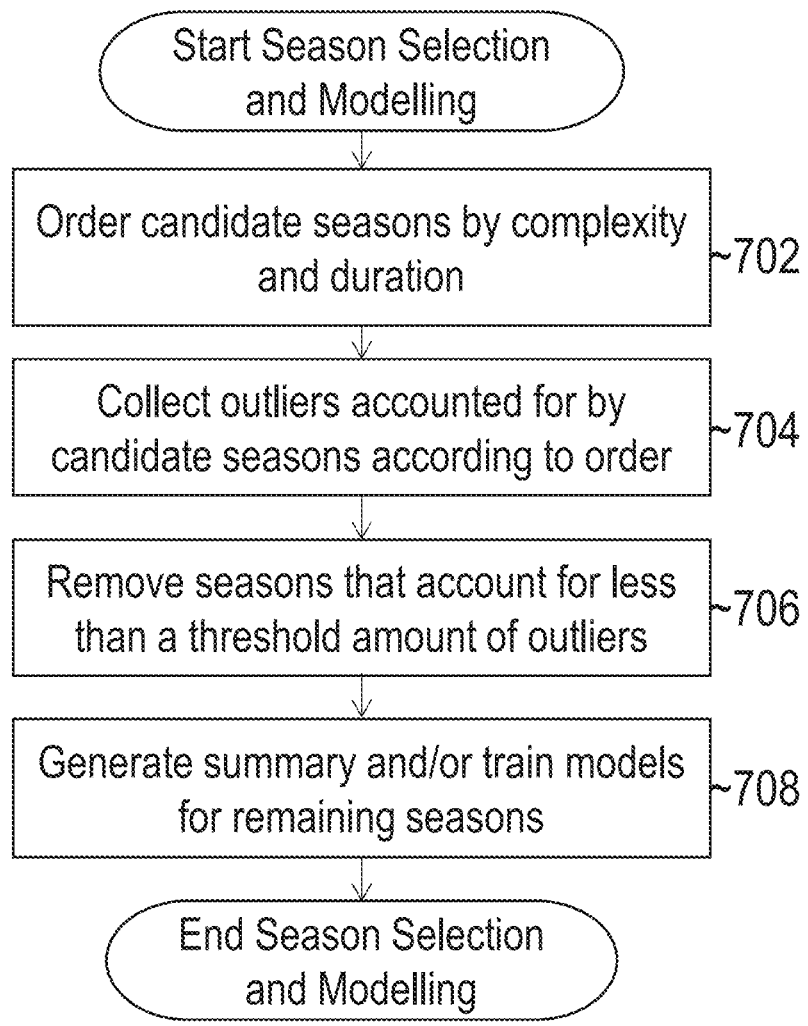
FIG. 7 illustrates an example set of operations for selecting and modelling long-term seasons in accordance with some embodiments.

FIG. 7 illustrates an example set of operations for selecting and modelling long-term seasons in accordance with some embodiments. The set of operations includes ordering a set of candidate seasons by complexity and duration (operation 702). Seasonality analytic 132 may order candidate seasons by longest and/or most complex first or vice versa. For example, a three-month season may be ordered before a two-month season, which may be ordered before a one-month season.

Seasonality analytic 132 next collects outlier values that are accounted for by the candidate seasons according to the order in which the candidate seasons are sorted (operation 704). For example, seasonality analytic 132 may first collect outliers for the three-month season, followed by the two-month season, followed by the one-month season.

Once the outlier values have been collected, seasonality analytic 132 (operation 706). For example, seasonality analytic 132 may remove seasons that do not account for any outliers when considered in the described ordering and/or remove seasons that account for less than 25% of the tail when ordered by coverage. Other thresholds may also be used, depending on the particular implementation. Another aspect of this approach is that seasonality analytic 132 analyzes the relative frequencies again, but this time in terms of the incrementally covered outliers. Encodings that are not statistically significant may be removed from the final result.

After removing the statistically insignificant seasons, seasonality analytic 132 generates a summary and/or trains one or more models for the remaining seasons (operation 708).

A summary may include a description and/or other data that identifies the long-term seasons that were detected. For example, a summary may indicate "A seasonal high was detected on the last business day of the month" or "A seasonal low was detected every other Saturday". The summary may be displayed or otherwise presented through an interface. Additionally or alternatively, the summary may be used to train one or more seasonal models, such as described in further detail below.

Figure 8A:
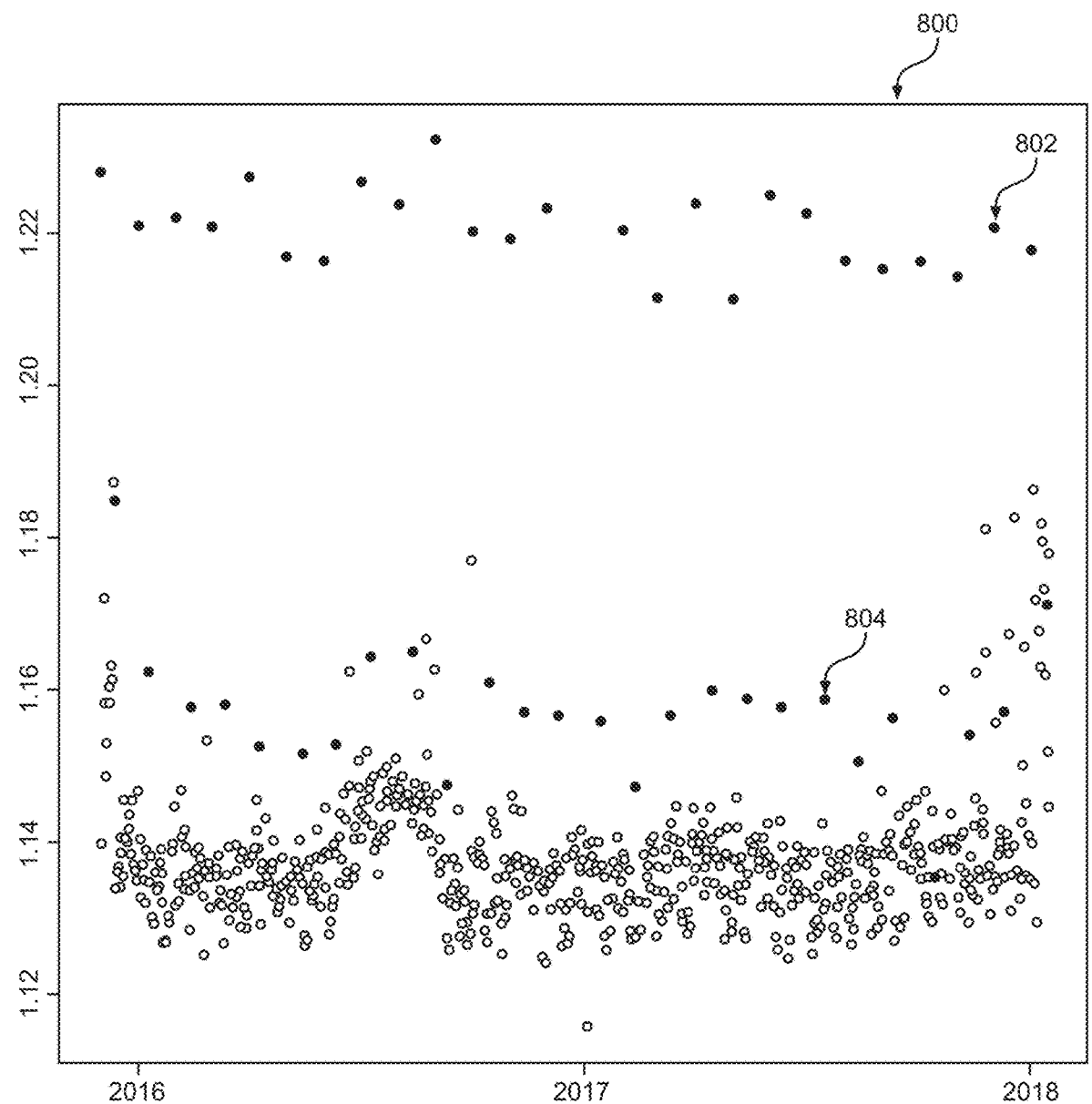
FIG. 8A illustrates an example visualization of a set of time-series data that includes outlier seasonal patterns in accordance with some embodiments.

In some embodiments, one or more interactive visualizations may be generated based on the long-term seasons that were detected. FIG. 8A illustrates example visualization 800 of a set of time-series data that includes outlier seasonal patterns in accordance with some embodiments. As can be seen, two long-term seasonal patterns are present in the time-series data. Data point 802 corresponds to a sparse high that occurs every last day of the month. Data point 804 corresponds to a much lower high that occurs every $2^{nd}$ Friday of the month.

Figure 8B:
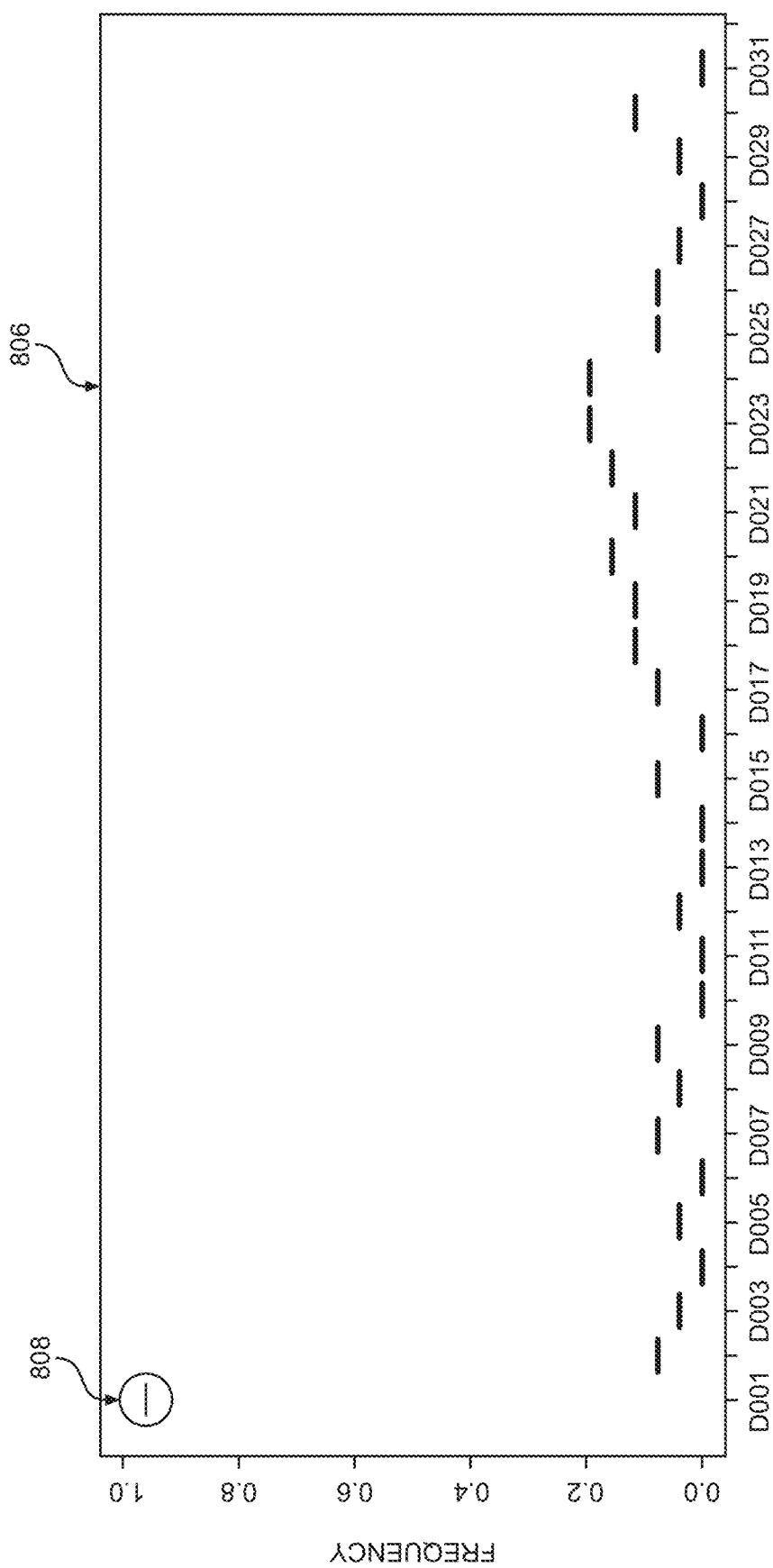
FIG. 8B illustrates an example visualization presenting relative frequencies for different encodings for a one-month season in the days remaining count season encoding space in accordance with some embodiments.

FIG. 8B illustrates example visualization 806 presenting relative frequencies for different encodings for a one-month season in the days remaining count season encoding space in accordance with some embodiments. Encoding 808 (corresponding to D001) has a relative frequency of over 0.9, which exceeds a threshold of 0.6. Based on the encodings, it may be quickly determined that a long-term season is present for the last day of the month, but not for other days in this encoding space.

Figure 8C:
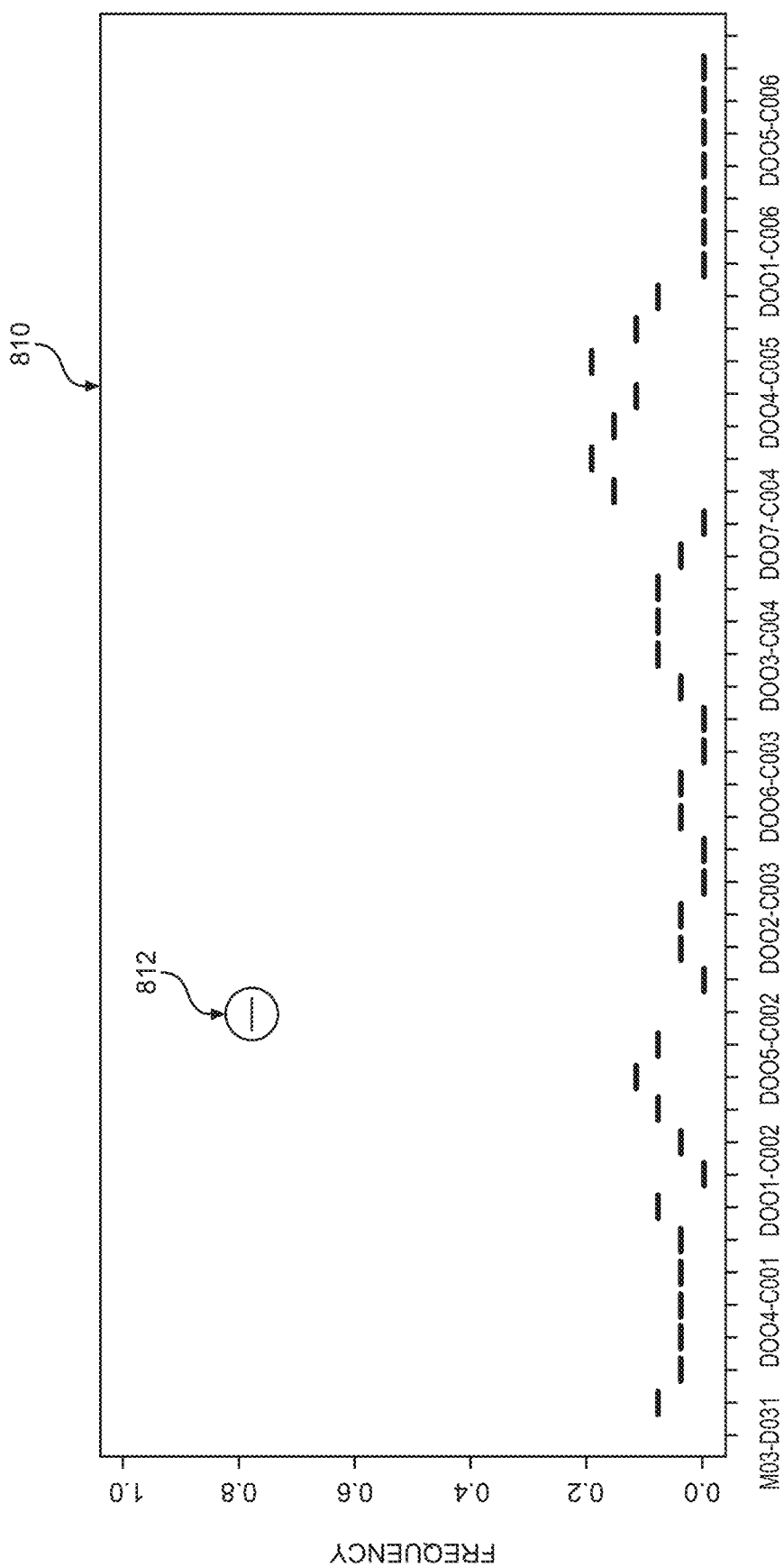
FIG. 8C illustrates an example visualization presenting relative frequencies for different encodings for a one-month season in the days of the week count encoding space in accordance with some embodiments.

FIG. 8C illustrates example visualization 810 presenting relative frequencies for different encodings for a one-month season in the days of the week count encoding space in accordance with some embodiments. In this example, encoding 812 (corresponding to D005-0002) has a relative frequency that exceeds the threshold. The remaining encodings do not have frequencies exceeding the threshold. Thus, it may be quickly determined that a long-term season is present for the $2^{nd}$ Friday of the month, but not for the other days of the week in the encoding space.

In some embodiments, a visualization may allow a user to drill-down and/or trigger seasonal-aware operations. For example, a visualization may present aggregate long-term seasonal patterns across several different hardware and/or software resources. A user may drill-down to view an individual resource or a subset of resources that are grouped together based on one or more common attributes. Upon drilling down, a second visualization may be presented to the user that identifies the long-term seasonal patterns associated with the selected resource or group of resources. A user may use the interface to launch one or more operations based on the summaries. Example operations are described further below in Section 5.0, titled "Seasonal-Aware Management Operations".

In some embodiments, the long-term season summaries are used to train one or more seasonal models. In the example depicted in FIGS. 8A-8C, for example, a first seasonal model may be trained using the outlier values for the last day of the month and a second seasonal model may be trained using the outlier values for the $2^{nd}$ Friday of the month. With the encoding-based detection processes, model training may be directed to allows model training to candidate seasons where a season is detected. There is no need to train models for encodings that do not represent a season. Further, the parameters and characteristics used to train a model may be determined, such as the duration of the season (e.g., one-month, two-month, etc.), irregularities in the seasonal period, and seasonal variations.

The models that are trained based on the detected long-term seasons may vary from implementation to implementation. Examples include, but are not limited to, baselining, anomaly detection and forecasting models. Training a model may generally comprise determining a seasonal contribution or component for a detected long-term season. The seasonal contribution may be additive or multiplicative in nature. Referring to FIG. 8A, for instance, the seasonal contribution for the last day of the month is approximately 0.08 (1.22-1.14) in the additive case and 1.07 (1.22/1.14) in the multiplicative case. The seasonal factor for the $2^{nd}$ Friday of the month is approximately 0.02 (1.16-1.14) in the additive case and 1.02 (1.16/1.14) in the multiplicative case. The manner in which the seasons are modelled may thus vary depending on the particular implementation. Techniques for generating a forecasting model are described in more detail in the section below.

4.0 Modelling Patterns to Account for Variable Seasonality

In some embodiments, forecasting analytic 134 is configured to train and evaluated forecasting models for input time-series that have variable seasons. Forecasting analytic 134 may model long-term seasons detected by seasonality analytic 132 and/or season detected or otherwise provided from other sources. The process of training and evaluating a forecasting model may include, but is not limited to, clustering samples by season type and season space, iteratively combining low sample sets with the closest, compatible set until no further combination can be made or there are no low sample sets remaining, and trending each collection of samples independently.

In some embodiments, a detected season is associated with a "season space". A season space in this context indicates how the season was detected and how the eventual forecast may be constructed. Short-term seasons, (e.g., hourly, daily and/or weekly seasons, depending on the implementation) may be classified as being in an "observed" season space because these seasons may be detected from a decomposition of observed samples and may be leveraged to form the based of a created forecast. In this case, forecasting analytic 134 may allow a contribution for a season in the observed space to the forecast. The contribution for this space may be the first one made in the construction of the forecast.

In some embodiments long-terms seasons are classified as being in an "outlier" season space. Long-term seasons may be detected in a collection of outliers after short-term seasonal patterns are removed. Long-term seasons may thus be classified as seasons that do not fit season types in the short-term space. Each outlier season may make a contribution to the forecast. For example, a season on detected on the last day of the month may make one contribution, and a season detected every other Friday may make another contribution.

Within a given space, there may be one or more season types. For example, in the observed season space, there may be daily lows, daily highs, weekly lows, weekly highs, and/or sparse highs. Within the outlier space, there may be monthly highs, monthly lows, and/or any of the season types depicted in FIG. 6. Additionally or alternatively, other season types may be defined, depending on the particular implementation.

In some embodiments, seasonal contributions for different seasons are determined by clustering, within memory, time-series data points by season type and season space. Clustering allows forecasting analytic 134 to efficiently determine the seasonal contributions of different seasons to a forecast. For example, forecasting analytic 134 may trend distinct clusters over different durations depending on the space of the seasons. Trends for one season may vary from trends in another season. In some cases, the trends may move in opposite directions. For instances, a monthly outlier high may trend lower each month while a daily average high may trend higher.

In some embodiments, a forecasted value is generated by aggregating the contributions of multiple seasons. For example, if a forecast is desired at a timestamp and that timestamp places the requested forecast in a dense high season and two long term seasons, then the forecast may include three contributions: one for the dense high season and two from the long-term seasons. Contributions may be added, multiplied, or otherwise aggregated depending on the particular implementation.

Figure 9:
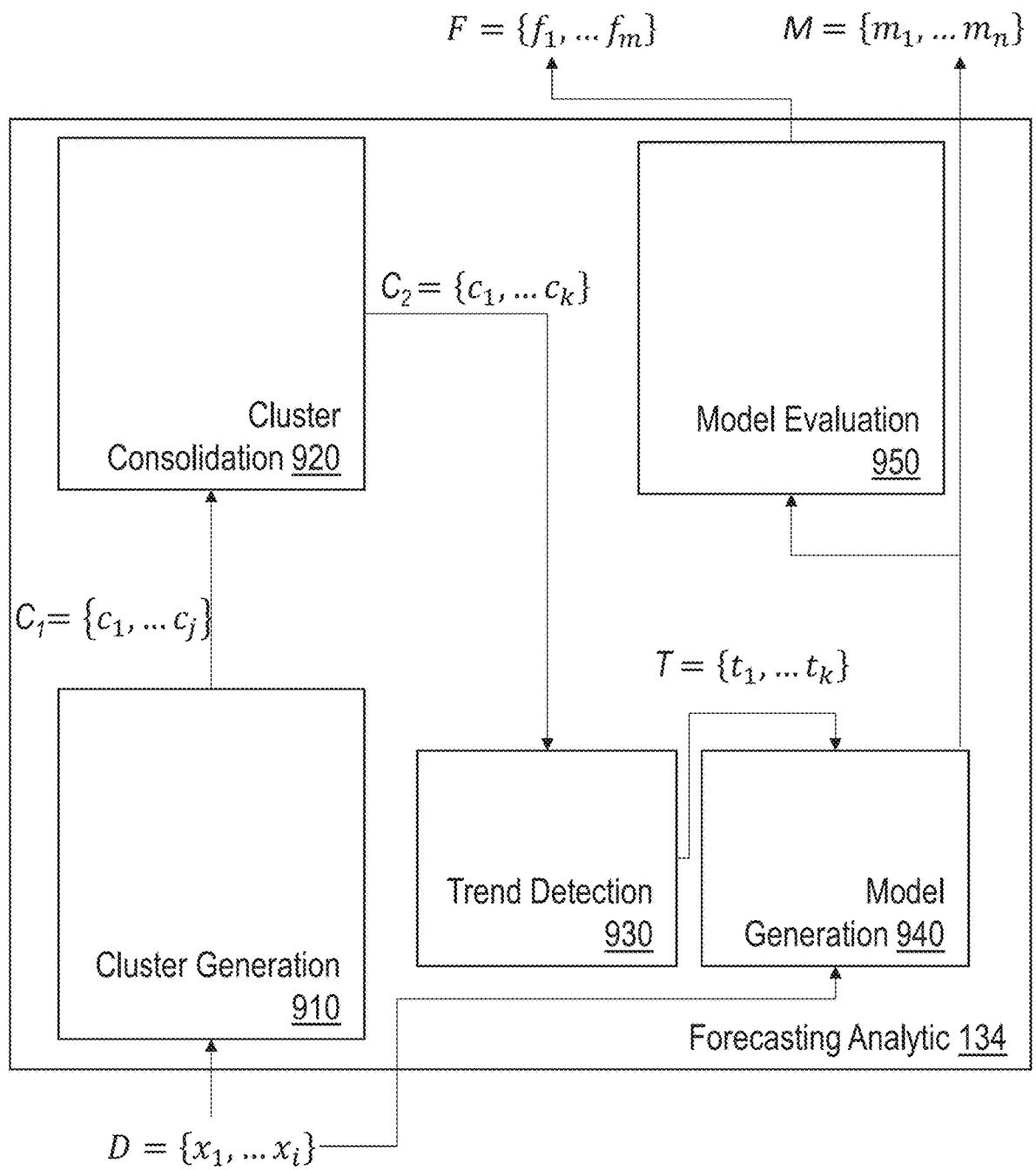
FIG. 9 illustrates an example data flow diagram for a forecasting analytic in accordance with some embodiments.

FIG. 9 illustrates an example data flow diagram for forecasting analytic 134 in accordance with some embodiments. Cluster generation block 910 receives a time-series dataset D, which includes a set of data points $\{x_1, \ldots, x_i\}$ representing metric values measured or otherwise observed over time. Cluster generation block 910 generates a set of clusters $C_I$ where each of the clusters $\{c_1, \ldots, c_j\}$ includes a subset of one or more data points from the time-series dataset D. The clusters may organize the data points by season type and season space.

Cluster consolidation block 920 receives the set of clusters $C_1$ and consolidates low sample clusters, if any, by merging these clusters together or with higher sample clusters that are compatible. Cluster consolidation block 920 outputs the consolidated set of clusters $C_2$.

Trend detection block 930 receives the consolidated set of clusters and independently trends each cluster. In some embodiments, trend detection block 930 may trend over different durations depending on the space of the seasons. Trend detection block 930 outputs a set of trend data T that identifies trend information for each of the clusters in $C_2$. For example, the trend may identify the slope (e.g., the rate of increase or decrease) in metric values that belong to a cluster.

Model generation block 940 trains a forecasting model based on the trend information T and the time-series dataset D. Model generation block 940 generates a set of model components M that represent the contributions of each season to a forecast. Example model components may include, but are not limited to, level components (e.g, the mean value for a set of time-series data within a particular time window), trend components (e.g., the rate of change for detected seasons), and seasonal components (e.g., the seasonal factors for the detected seasons).

Model evaluation block 950 is configured to fetch and evaluate the forecasting model. For a given timestamp, model evaluation block 950 may generate a forecasted value based on the model components in M. Model evaluation block 950 may generate a set of forecasted value up to a prescribed horizon. The forecast result F includes the set of forecasted values $\{f_1, \ldots f_m\}$ for each timestamp up to the horizon.

Figure 10:
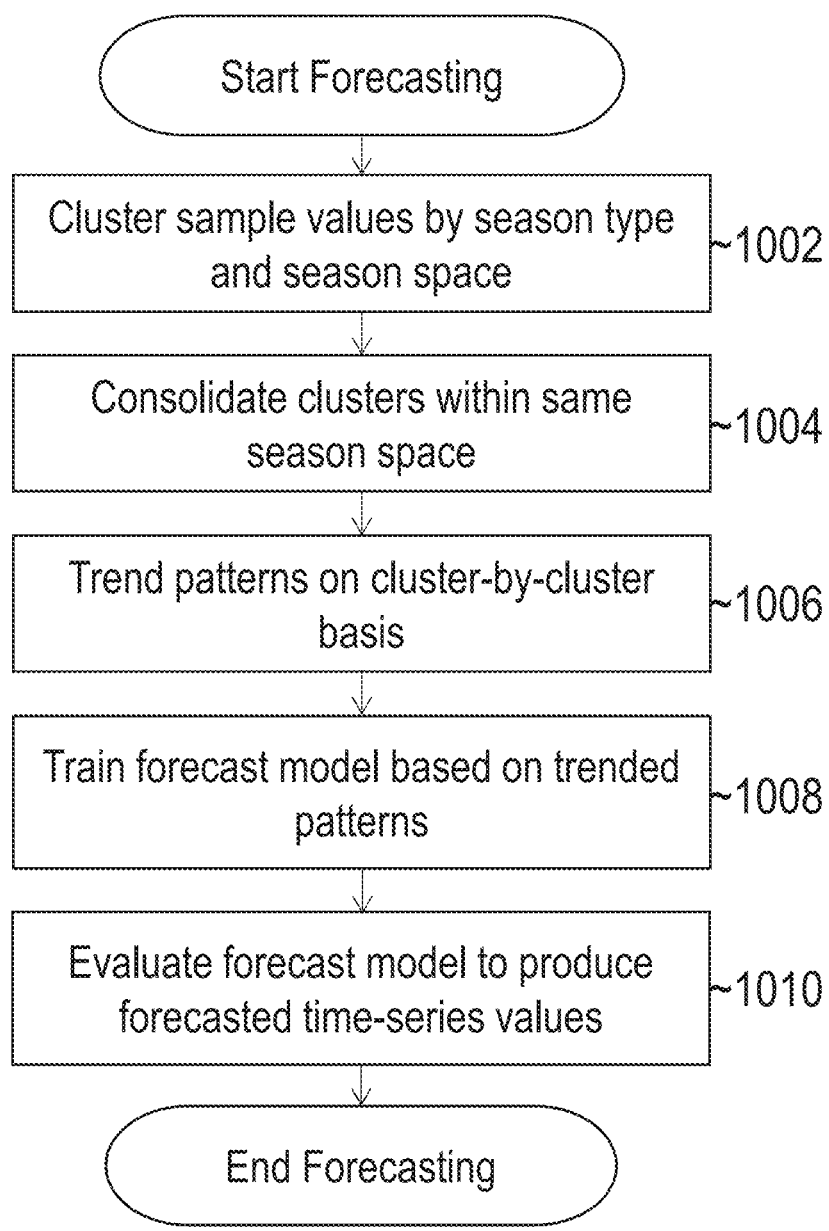
FIG. 10 illustrates an example set of operations for generating a forecast time-series in accordance with some embodiments.

FIG. 10 illustrates an example set of operations for generating a forecast time-series in accordance with some embodiments. Forecasting analytic 134 clusters sample values within a time-series dataset by season type and season space (operation 1002). For example, values may be grouped into an outlier space and an observed space. Within each season space, the values may be assigned to a cluster based on what season the value was in when observed.

Forecasting analytic 134 next consolidates compatible clusters within the same season space (operation 1004). For example, forecasting analytic 134 may merge low-sample clusters in the outlier space and/or the observed space. As previously mentioned, merging clusters within a space may lead to more accurate forecasts when a season is associated with too few samples to make a statistically meaningful contribution to a forecast. If all samples have a threshold number of clusters, then the process may continue without merging any clusters.

Once the final set of clusters has been generated, forecasting analytic 134 trends patterns on a cluster-by-cluster basis (operation 1006). For example, if there are two long-term seasons detected and one short-term season, then forecasting analytic 134 may trend three clusters: one representing the short-term season, one representing one of the two long-term seasons, and one representing the other of the two clusters.

Forecasting analytic 134 trains a forecast model based on the trended patterns (operation 1008). The forecast model may include level components, trend components, and/or seasonal components as previously described.

After the forecast model has been generated, forecasting analytic 134 evaluates the forecast model to produce forecasted time-series values (operation 1010). In some embodiments, the forecast model may be evaluated on demand, such as in response to a request to an application or other user. In other embodiments, the forecast model may be evaluated periodically, such as on a monthly basis, or may be triggered by a detected event. For example, forecasting analytic 134 may generate a monthly forecast report or may periodically generate forecast reports on some other recurring basis. As another example, a forecast may be triggered if resource utilization reaches a threshold or some other event is detected. The generated forecast may be used to perform one or more seasonal-aware operations such as described in Section 5.0, titled "Seasonal-Aware Management Operations".

4.1 Clustering Samples by Season Type and Space

As previously mentioned, forecasting analytic 134 may cluster sample values from a time-series by season space and season type. In some embodiments, the season space and/or type is automatically detected and characterized by seasonality analytic 132 using machine-learning techniques. For example, seasonality analytic 132 may detect and characterize long-term seasons as described above in Section 3.0, titled "Long-term Season Detection and Characterization". Additionally or alternatively, seasonality analytic may learn and characterize seasonal patterns using the techniques described in in U.S. application Ser. No. 15/057,065, now U.S. Pat. No. 10,331,802, entitled "SYSTEM FOR DETECTING AND CHARACTERIZING SEASONS"; U.S. application Ser. No. 15/057,060, now U.S. Pat. No. 10,699,211, entitled "SUPERVISED METHOD FOR CLASSIFYING SEASONAL PATTERNS"; and/or U.S. application Ser. No. 15/057,062, now U.S. Pat. No. 10,885,461, entitled "UNSUPERVISED METHOD FOR CLASSIFYING SEASONAL PATTERNS", the entire contents for each of which were previously incorporated by reference herein as if set forth in their entirety.

In other embodiments, the seasons spaces and season types may be manually defined. For example, a user may annotate a time-series dataset with labels identifying the season type and season space for outliers and/or other sample values.

In some embodiments, summary information for the detected seasons retain information that may be used for clustering. The summary data may include, without limitation, information that describes the season space (e.g., observed vs. outlier), information that enables encoding and containment classification for new timestamps, information that identifies the season type and character (e.g., low, high, sparse high), and statistical properties useful to generate forecasts (e.g., the nominal factor for an encoding contained in the season and outlier samples if the season is in the outlier space).

Once the season information has been received, forecasting analytic may organize the original samples into sets for each season instance and one for the set of samples not contained in any season. The organization and clustering process may have steps that are dependent on the space of the seasons being collected. If the season instance is in the observed space, then forecasting analytic 134 may cluster the raw time-series samples that are contained in the season beginning after the most recent regime change if any regime changes are detected. If the season instance is in the outlier space, then outlier values may be collected and organized whether they occur before or after a regime change. Thus, the season space may dictate if clustered values are observed or outlier samples. The season space may also dictate if collected values are conditional (observed) or independent (outlier) of a detected regime change.

Figure 11:
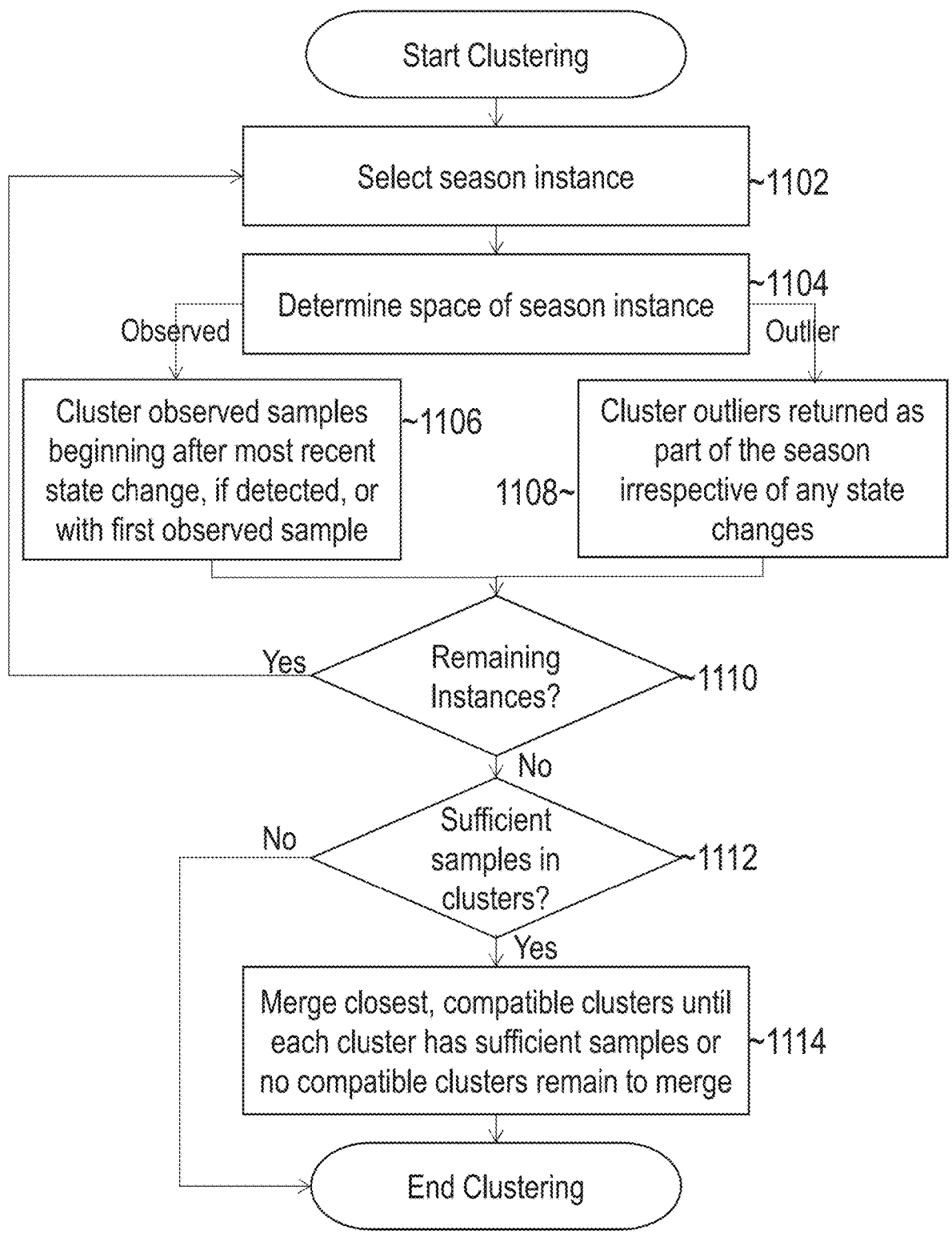
FIG. 11 illustrates an example set of operations for clustering time-series data points by season space and type in accordance with some embodiments.

FIG. 11 illustrates an example set of operations for clustering time-series data points by season space and type in accordance with some embodiments. The set of operations includes selecting a season instance from a set of detected seasons (operation 1102). As previously noted, the set of seasons may be identified based on the output of seasonality analytic 132. Additionally or alternatively, one or more seasons may be identified by a user or other source For the selected season, forecasting analytic 134 determines the space of the season instance (operation 1104). For example, forecasting analytic 134 may determine whether the season is detected in the outlier space or in the observed space. Additionally or alternatively other season spaces may be defined. For example, the outlier and/or observed space may be sub-divided into additional spaces. For example, the observed space may be sub-divided into weekly season space, daily season space, and/or an hourly season space. The outlier space may also be sub-divided into different spaces based on season duration.

If the season instance is in the observed space, then forecasting analytic 134 clusters observed samples for the season instance beginning after the most recent state change if detected, or with the first observed sample (operation 1106). Forecasting analytic 134 may determine whether there are any state changes based on the output of a state change analytic, such as described in U.S. application Ser. No. 15/266,979, now U.S. Pat. No. 10,970,891, entitled "SYSTEMS AND METHODS FOR DETECTING AND ACCOMMODATING STATE CHANGES IN MODELLING", which was previously incorporate by reference. The output may include a timestamp identifying the most recent state change. Forecasting analytic 134 may then analyze sample values observed after the timestamp to determine what season the values were in when observed. To determine whether a sample value is part of the season instance forecasting analytic 134 may compare a timestamp associated with the sample value to the summary information about the season. If the timestamp falls within the season, then the value is retained as part of the cluster. Otherwise the value is discarded. For example, if the season instance is for daily highs observed between 10 a.m. and noon, then forecasting analytic 134 may determine whether a sample value was observed within that timeframe. If the timestamp falls between 10 a.m. and noon, then the sample value is retained for the cluster. Otherwise, the sample is discarded.

If the season instance is in the outlier space, then forecasting analytic 134 clusters outlier values returned as part of the season irrespective of any state changes (operation 1108). For example, if the season instance is for a monthly high on the $15^{th}$ of the month, then forecasting analytic 134 may collect all outliers from this timeframe. Clusters may included in or otherwise represented by one or more data structures. For example, data points in a cluster may be grouped in a linked list, tree structure, array, or similar data structure. The data points collected for a given cluster may be sorted or otherwise organized in chronological order based on associated timestamp values.

Once a cluster for the selected season instance has been generated, forecasting analytic 134 determines whether there are any remaining season instances (operation 1110). If so, then the process returns to operation 1102 and repeats for the next selected season instance. Once all season instances have been processed, any remaining samples from a time-series not previously assigned to a cluster may be assigned to a cluster of data points that are out of season.

After clusters for the set of season instances has been generated, forecasting analytic 134 determines whether there are sufficient samples in each cluster (operation 1112). If there are insufficient samples in one or more clusters, then the low-sample cluster(s) are merged with the closest, compatible cluster until each cluster has sufficient samples or no compatible clusters remain to merge (operation 1114). In some embodiments, operation 1114 may be implemented using an agglomerative approach where forecasting analytic 134 begins with the original set of cluster and incrementally merges one set with low samples into the closest compatible cluster. When two or more clusters are merged, a resulting cluster is generated that includes data points from the original clusters. The threshold for classifying a cluster as "low-sample" may vary from implementation to implementation. For example, a minimum threshold of three values may be set; however, other thresholds may be defined.

In some embodiments, clusters that belong to different season spaces are processed as incompatible. For example, clusters within the observed space may be merged together but not with clusters from the outlier space. Similarly, clusters from the outlier space may be merged, but not with clusters from the observed space. Other attributes of a season may also factor into compatibility. For example, high and low seasons may be deemed incompatible, whereas sparse highs and dense highs may be treated as compatible. The criteria for establishing cluster compatibility may thus vary from implementation to implementation.

In some embodiments, forecasting analytic 134 determines the closest cluster based on relative similarity among clusters. Relative similarity may be determined by comparing the seasonal factors and/or encoding factors of the clusters to be merged. For example, seasons with a low sample cluster may be merged with the cluster having the most similar seasonal factor, which may be determined as the minimum absolute value of difference between the seasonal factors. Two different monthly seasons may similar seasonal factors when the clusters group outliers having values that are close in range. These monthly seasons may be merged together based on the relatively small difference in seasonal factors.

Additionally or alternatively, encoding factors may be factored in to the merging process. For example, a monthly season may be detected on the $15^{th}$ of the month and the $16^{th}$ of the month. The proximity and seasonal duration of the two seasons make these seasons good candidates for being merged, especially if the seasonal factors are similar. Thus, forecasting analytic 134 may select the closest cluster as a function of the similarity of seasonal factors and/or encoding factors.

In some embodiments, forecasting analytic 134 may be configured to check for a corner case where the only clusters that remain after the merging process are a cluster for the out-of-season samples and a cluster of samples for all season instances in the outlier space that have a low sample count. To address this case, forecasting analytic 134 may replace the cluster containing the out-of-season samples with all samples and getting rid of the cluster of outlier sets. The result of training and evaluating a forecast model in this case is a forecast that is the seasons encoding factors overlaid on the trend of all samples.

4.2 Training a Forecasting Model from Clustered Samples

Figure 12:
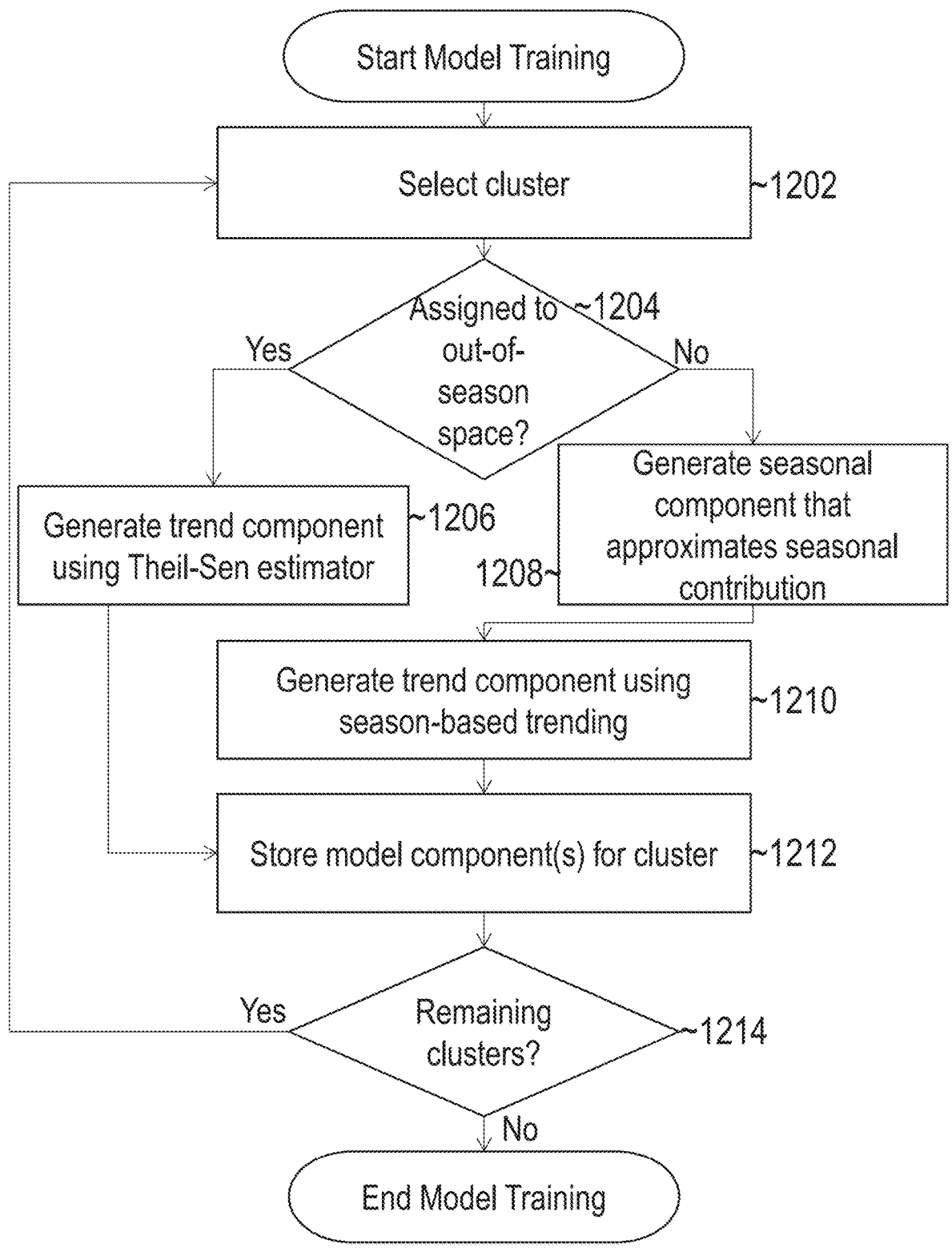
FIG. 12 illustrates an example set of operations for training a forecasting model that accounts for variable seasonality in accordance with some embodiments.

In some embodiments, forecasting analytic 134 is configured to train a forecast model using the final set of clusters. FIG. 12 illustrates an example set of operations for training a forecasting model that accounts for variable seasonality in accordance with some embodiments. The set of operations includes selecting a cluster from the final set of clusters (operation 1202).

Forecasting analytic 134 determines whether the selected cluster is assigned to an out-of-season space (operation 1204). As previously mentioned, a cluster in the out-of-season space includes sample values that are observed in a timeframe that is not within any of the observed or outlier seasons.

If the cluster is in the out-of-season space, then forecasting analytic 134 generates the trend component using a Theil-Sen estimator (operation 1206). The Theil-Sen estimator is a process for fitting a line to sample values based on the median of the slopes between data point pairs. Stated another way, forecasting analytic 134 may compute the slope for each unique pair of data points in the cluster to obtain a set of slopes. Forecasting analytic 134 may then identify the median slope in the set of slopes. The median slope may then be used to represent the trend component for the out-of-season data points. The Theil-Sen estimator may be computed efficiently and is not adversely impacted by outliers. However, in other embodiments, the trend component may be generated using other linear regression techniques, such as linear least squares regression.

If a cluster is within a seasonal space, then forecasting analytic 134, generates a seasonal component that approximates a seasonal contribution for the selected cluster (operation 1208). As previously mentioned, a seasonal contribution may be additive or multiplicative in nature. For example, in the additive case, if average database logons are observed to decrease by 50 every other Friday, then a seasonal factor of −50 may be applied. In the multiplicative case, if CPU utilization increases by 10% every $15^{th}$ of the month, then a seasonal factor of 1.1 may be applied through multiplication.

If a cluster is within a seasonal space, then forecasting analytic 134 also generates the trend component using a season-based trending method (operation 1210). In some embodiments, the trending methods described in U.S. application Ser. No. 15/266,987, entitled "SYSTEMS AND METHODS FOR TRENDING PATTERNS WITHIN TIME-SERIES DATA" are used to generate the trend component for the cluster. The techniques described therein may further be used to compute season-specific uncertainty intervals. However, other regression-based techniques may also be used, depending on the particular implementation.

Forecasting analytic 134 stores the model components for the cluster in volatile and/or non-volatile storage (operation 1212). In some embodiments, a mapping may be stored that maps the cluster to the cluster components. The mapping may be accessed to allow for more efficient computation of forecasts and to generate season-specific forecasts. For example, a user may be interested in forecasting only the last business day of the month. The model's components for this season may be accessed independent of model components stored for other clusters/seasons to generate the forecast. The evaluation process may use the mapping to read only the components that will be used into memory.

Once the model components for a cluster have been stored, forecasting analytic 134 determines whether there are any remaining clusters (operation 1214). If so then the process returns to operation 1202 and repeats to generate model components for the next cluster. After components for all the clusters have been generated, the process ends.

4.3 Generating Forecasts

Figure 13:
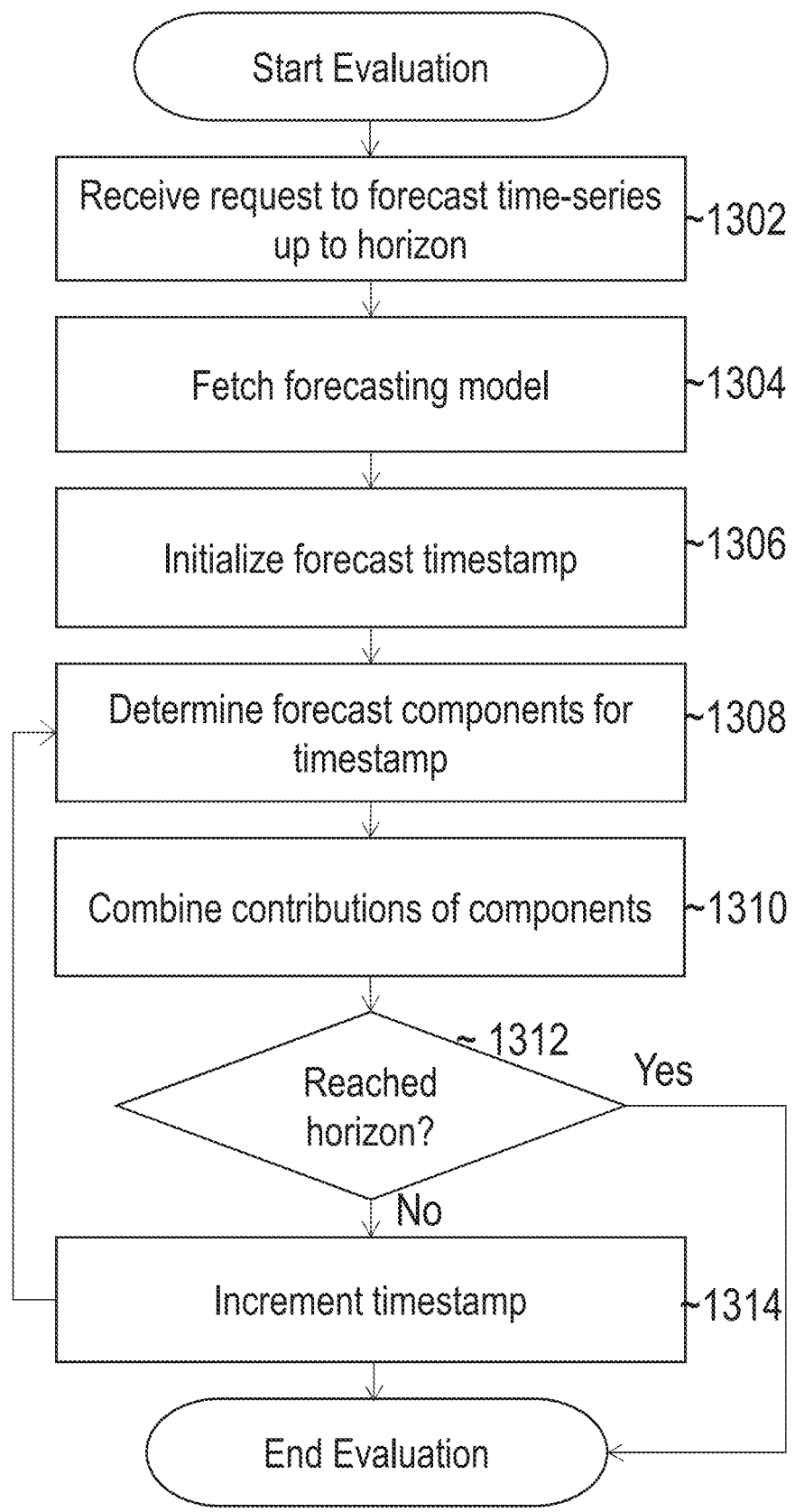
FIG. 13 illustrates an example set of operations for evaluating a forecasting model that accounts for variable seasonality to generate a set of forecasted values in accordance with some embodiments.

Once trained, a forecast model may be used to generate a forecast. FIG. 13 illustrates an example set of operations for evaluating a forecasting model that accounts for variable seasonality to generate a set of forecasted values in accordance with some embodiments. The set of operations include receiving a request to forecast a time-series up to a horizon (operation 1302). As previously mentioned, forecasts may be generated on-demand, on a periodic basis, or in response to a detected event. For example, a query may request a forecast for memory throughput on Host A over the next month. If the request does not specify a prescribed horizon, a default value may be used, which may be configurable by an end user.

Forecast analytic 134 next fetches a forecasting model based on the request (operation 1304). In the previous example, for instance, forecast analytic 134 may fetch a forecast model trained using memory throughput performance data collected from Host A. In some cases, a request may specify a particular season or subset of seasons for which a forecast is desired. For example, a user may request a forecast for only the monthly highs or for a holiday season. Forecast analytic 134 may fetch the model components that are relevant to the request using the mapping data, as previously described.

Responsive to the request, forecasting analytic 134 further initializes a forecast timestamp (operation 1306). The initialized timestamp represents the first timestamp in the requested forecast. A default value (e.g., the current time incremented by one) may be used as the initial timestamp. In other cases, the request may specify a starting time for the forecast (e.g., "What is the projected CPU utilization from June 1, 2019 to July 1, 2019?").

Once a forecast timestamp has been initialized, forecasting analytic 134 determines the forecast components for the timestamp (operation 1308). For example, forecasting analytic 134 may determine the level components, trends, seasonal factors, and/or forecast uncertainties for the timestamp for any seasons that contribute to the forecast value. For a given timestamp, there may be three types of contributions: one for the out-of-season trend, one or more for the seasons in the observed space, and one or more for the seasons in the outlier space.

In some embodiments, to determine forecast and uncertainty contributions, forecasting analytic 134 starts with the out-of-season contributions if there is not at least one contribution from a season in the observed space. If there is at least one set of contributions from seasons in the observed space, the forecast and uncertainty may be set to the contributions of the season instance based on type-character priority. For example, low season may be given lower priority than high seasons, and high seasons may be given lower priority than sparse high seasons. As a result, forecasting analytic 134 has a value for the forecast and its uncertainty—either from the trend of the out-of-season samples or at least one of the seasons in the observed space. Forecast analytic 134 may next determine the contributions for each of the outlier seasons, if any.

Once all the component contributions have been determined, forecasting analytic 134 combines the contributions (operation 1310). In some embodiments, forecasting analytic 134 stacks the contributions of all seasons in the outlier space onto the initialized forecast and uncertainty determined for the observed or out-of-season space. Stacking is possible because outlier seasons have components that are defined relative to their offset values—specifically stacking the nominal outlier for the encoding in the season effectively simulates how the pattern would overlay itself on an estimate of the observed pattern. In some embodiments, this operation may involve only one set of contributions from a single season in the outlier space.

In some embodiments, a constraint may be defined such that a season in the outlier space and/or observed space (or specific types of seasons in the outlier and/or observed space) are allowed to make only a single contribution for forecast and uncertainty for a single timestamp. For example, ambiguous seasons may be constrained to make only one contribution per timestamp. This approach helps constrain forecast and uncertainty intervals to a more reasonable level where ambiguity exists.

Once the forecast value has been generated by combining the contributions, forecast analytic 134 determines whether the prescribed horizon has been reached (operation 1312). If not, then the timestamp is incremented (operation 1314). For example, the timestamp may be incremented by five minutes to generate forecast values at five-minute intervals. The amount by which the timestamp is incremented may vary from implementation to implementation.

After the horizon has been reached, the set of forecast values is stored and/or presented to the requesting client. The set of forecast values may be used to trigger various automated actions including generate/updating interactive visualization and performing seasonal-aware operations. Example seasonal-aware operations are described further below in Section 5.0, titled "Seasonal-Aware Management Operations".

Figure 14:
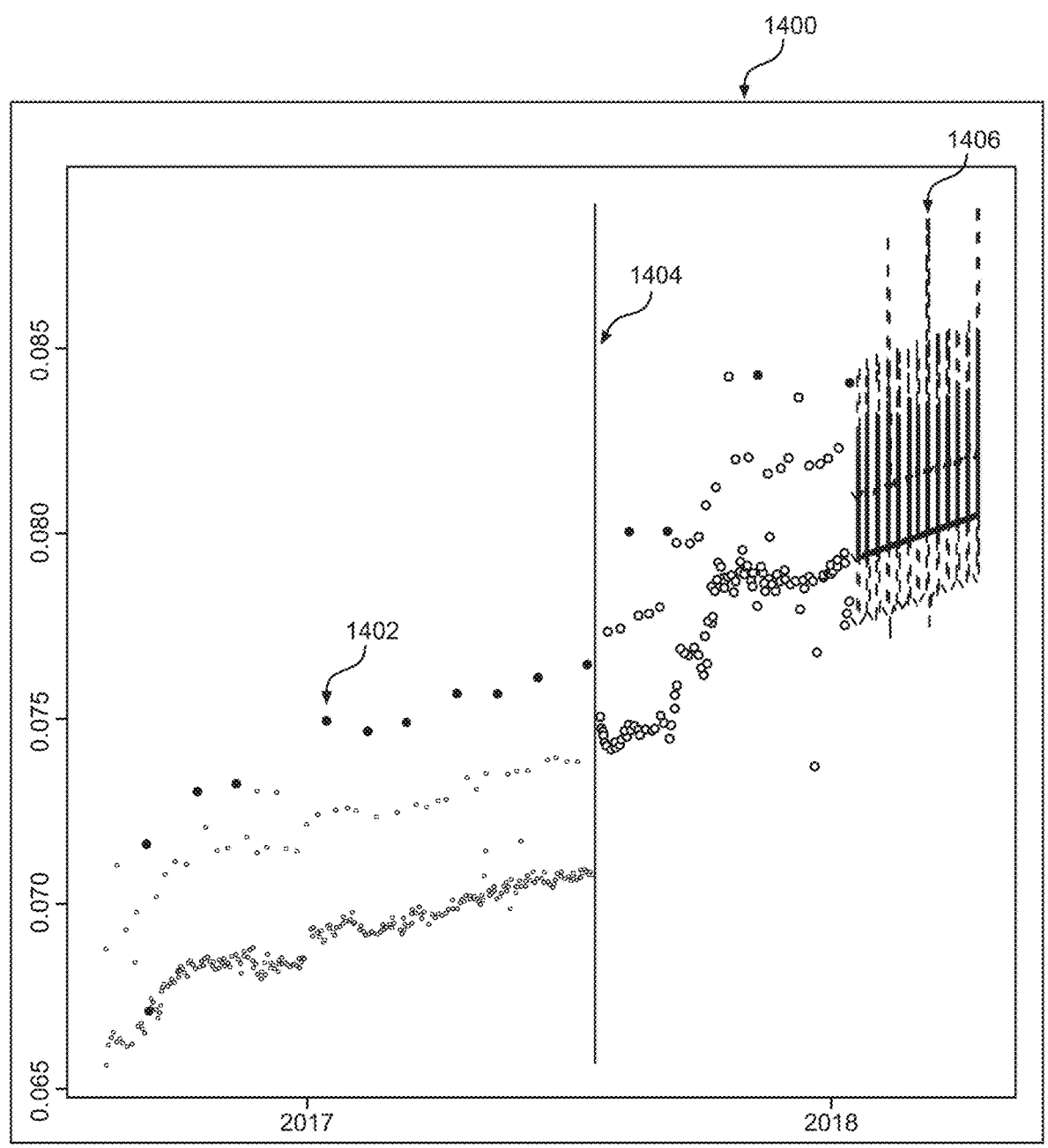
FIG. 14 illustrates an example visualization of a forecast that accounts for seasonal variability in a time-series in accordance with some embodiments.

FIG. 14 illustrates example visualization 1400 of a forecast that accounts for seasonal variability in a time-series in accordance with some embodiments. Display area 1402 illustrates a set of time-series before the forecast. As can be seen, seasonal highs can in the outlier space are detected on the 9-11$^{th}$ of the month or the first weekend day after. At time 1404, a state change is observed. The observed data set suddenly jumps higher. The outlier data set transition is much smoother, but also trends higher. Forecast 1406 is displayed with uncertainty intervals varying by season.

In some embodiments, forecast analytic 134 may maintain multiple forecast models trained using different sets of time-series for different individual and/or aggregate metrics. For example, forecast analytic 134 may train a model based on aggregate database logons across a plurality of host databases. Additionally or alternatively, forecast analytic 134 may train a model based on database logons for individual host databases. The aggregate and individual models may be linked to allow a user to drill-down on related forecasts. For instance, the user may be presented with a visualization displaying a forecast for an aggregate set of resources. The user may then select icons or other interface elements representing individual hosts to navigate to a visualization displaying a forecast for the selected host. This allows the user to gain insights into how individual resources affect an aggregate forecast.

5.0 Seasonal-Aware Management Operations

The summary and/or forecast data that is generated may be integrated into or otherwise provided upon request to one or more applications. Example applications that may generate and/or access the summary data to perform various seasonal-aware operations may include, without limitation:

- A seasonal-aware anomaly detection and training system that uses the summary data to train and evaluate anomaly detectors, accounting for short-term and/or long-term seasonal highs, seasonal lows, and/or other seasonal patterns. For instance, a sudden spike in database logons may appear to be an anomalous high, but may, in actuality, be a monthly sparse high. The anomaly detectors may be trained based on such seasonal patterns to reduce false flags when identifying and classifying anomalies.
- A maintenance planning system that uses the summary and/or forecast data to schedule and perform maintenance at optimal times. For example, maintenance may be set for a window of time that has maximal overlap with short and/or long-term seasonal lows for target software or hardware deployments that are being monitored.
- A job scheduling system that uses the summary and/or forecast data when scheduling collection of statistics, memory compaction, or other similar batch jobs. The process may schedule the batch jobs to overlap with seasonal lows.
- A consolidation system that uses the summary and/or forecast data to recommend resource consolidation or to automatically consolidate resources. For instance, a set of target hardware and/or software resources with non-overlapping seasons may be consolidated into a single hardware or software resource.
- A capacity planning system that uses the summary and/or forecast data to isolate and trend high seasons to determine whether the deployed software and/or hardware resources are sufficient to satisfy usage demands.

Applications, such as those listed above, may interact with analytic services 130 to request and/or receive summary and/or forecast data. The applications may specify one or more parameters, such as the set of time-series data to analyze, a forecast horizon, threshold values, etc. when submitting a request to analytic services 130. Based on the parameters, analytic services 130 may generate summaries characterizing long-term season and/or generate forecasts based on the techniques previously described.

In some embodiments, the projected values for a seasonal forecast may be used to plan, deploy, recommend, and/or order resources to handle increased resource usage. Different actions and/or recommendations may be set to trigger upon detecting that a projected value or trend exceeds a threshold. As an example, the projected sparse high values may indicate that resource usage will exceed a threshold thereby overloading current resources at a future time. In response, the system may recommend additional hardware and/or software resources to satisfy the projected increase in resource usages.

In other embodiments, the projected values may be used to consolidate resources. For instance, if resource usage is projected to decline past a threshold, then the system may recommend or automatically consolidate hardware and/or software resources to more efficiently utilize these resources and free up resources for other applications.

Based on a long-term season summaries and seasonal forecasts, administrators may determine a variety of characteristics associated with a particular resource or set of resources. For instance, the forecast may indicate whether there is a high risk of exhaustion for the resource, a high risk for exhaustion for batch (sparse) jobs but low risk for typical (dense) workloads, a low risk for exhaustion but increasing trend, a consistent, predictable scheduled load, a decreasing trend in load, etc. In the context of a clustered database that is distributed across multiple hosts, a user may determine if the system or any instance is likely to run out of capacity within the next 30 days (or some other horizon). The user may also determine if the load for two or more applications may be handled by a single database instance.

In some embodiments, the summaries and/or forecast may be integrated into one or more cloud applications. For example, a set of time-series data may be shared by multiple clients in a cloud storage system. Clients may submit requests to a cloud service to present information about long-term seasons and/or generate forecasts. In response, to the request, the cloud service may generate and present the request summary and/or forecast data in accordance with the techniques previously described.

6.0 Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants.

In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7.0 Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 15:
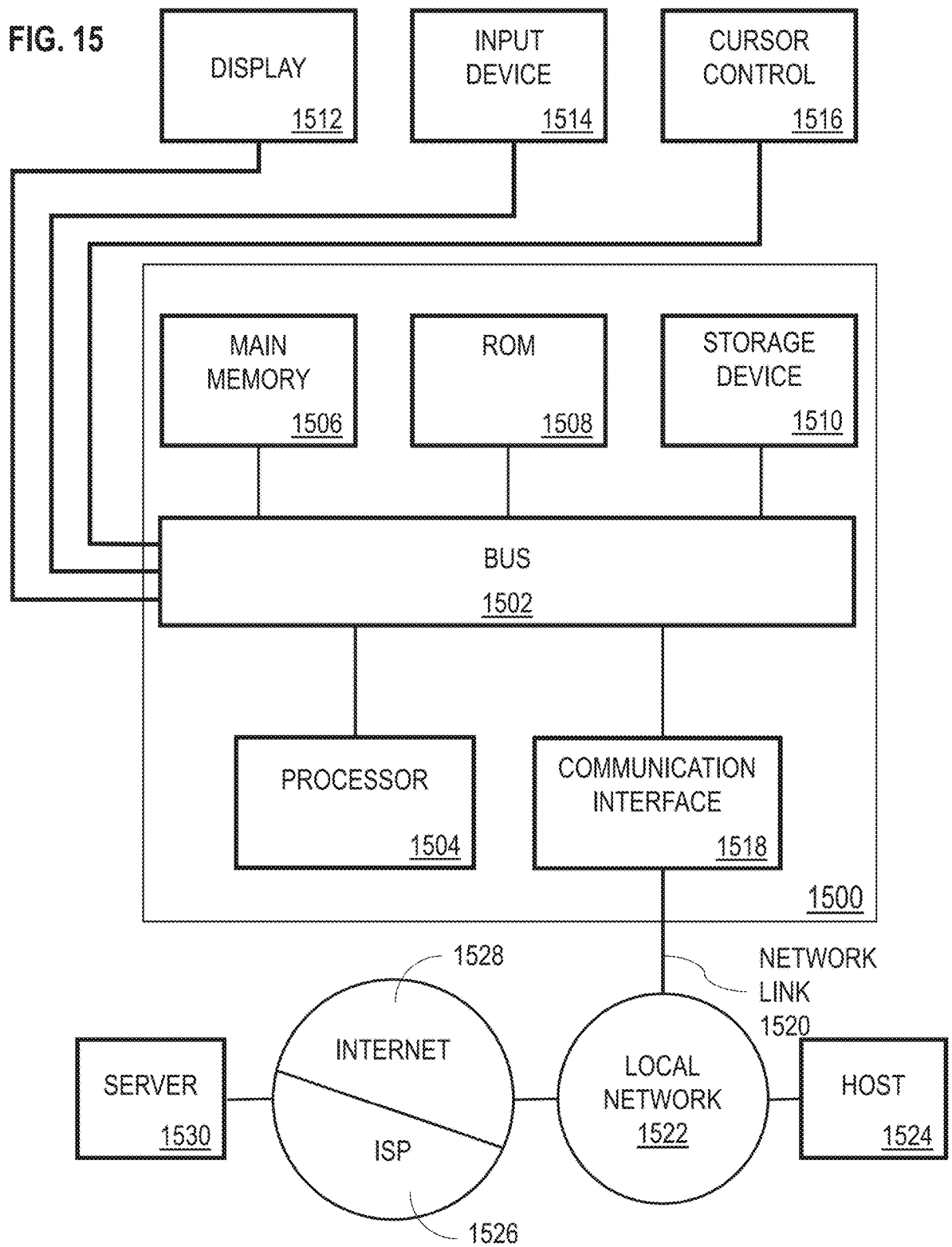
FIG. 15 shows a block diagram that illustrates a computer system in accordance with one or more embodiments.

For example, FIG. 15 is a block diagram that illustrates computer system 1500 upon which an embodiment of the invention may be implemented. Computer system 1500 includes bus 1502 or other communication mechanism for communicating information, and a hardware processor 1504 coupled with bus 1502 for processing information. Hardware processor 1504 may be, for example, a general purpose microprocessor.

Computer system 1500 also includes main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes read only memory (ROM) 1508 or other static storage device coupled to bus 1502 for storing static information and instructions for processor 1504. Storage device 1510, such as a magnetic disk or optical disk, is provided and coupled to bus 1502 for storing information and instructions.

Computer system 1500 may be coupled via bus 1502 to display 1512, such as a cathode ray tube (CRT) or light emitting diode (LED) monitor, for displaying information to a computer user. Input device 1514, which may include alphanumeric and other keys, is coupled to bus 1502 for communicating information and command selections to processor 1504. Another type of user input device is cursor control 1516, such as a mouse, a trackball, touchscreen, or cursor direction keys for communicating direction information and command selections to processor 1504 and for controlling cursor movement on display 1512. Input device 1514 typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 1500 can receive the data on the network line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9.0 Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
generating, within volatile or non-volatile memory, a set of data structures that separate sample values by season type and season space, wherein the sample values track a metric of at least one computing resource over time, wherein the set of data structures include a first set of clusters of sample values corresponding to different season types in a first season space and a second set of clusters of sample values corresponding to one or more season types in a second season space, wherein the first season space represents long-term season types and the second season space represents short-term season types, wherein the different season types in the first season space represent long-term seasonal patterns that do not fit the one or more season types in the second season space;
within the first set of clusters, generating at least one merged cluster by merging, within volatile or non-volatile memory, at least a first cluster with at least a second cluster, wherein the first cluster is most similar, relatively within the first set of clusters, to the second cluster in terms of a seasonal pattern, wherein the first cluster and the second cluster are not merged with clusters in the second set of clusters in the second season space;

determining a trend pattern for the at least one merged cluster;

generating a forecast for the metric of the at least one computing resource based, at least in part, on the trend pattern for the at least one merged cluster; and performing one or more seasonal-aware management operations based on the forecast.

2. The method of claim 1, wherein generating the forecast comprises combining the trend pattern for the at least one merged cluster with at least one trend pattern for the second set of clusters.

3. The method of claim 1, wherein the first set of clusters are associated with an outlier season space; and wherein the second set of clusters are associated with an observed season space.

4. The method of claim 1, wherein generating the at least one merged cluster comprises selecting the first cluster in the first set of clusters to merge responsive to determining that the first cluster has a sample count that is lower than a threshold.

5. The method of claim 1, wherein the second cluster is identified as the most similar, relatively within the first set of clusters, based on at least one of a seasonal factor associated with the second cluster or an encoding associated with the second cluster.

6. The method of claim 1, further comprising determining a seasonal component for the at least one merged cluster; wherein the forecast is further generated based on the seasonal component for the at least one merged cluster.

7. The method of claim 1, wherein generating the forecast comprises aggregating contributions from the at least one merged cluster associated with the first season space, at least one cluster associated with the second season space, and at least one cluster associated with an out-of-season space.

8. The method of claim 1, wherein generating the forecast comprises aggregating contributions from the at least one merged cluster with another unmerged cluster in the first set of clusters to generate a forecast value for a particular timestamp.

9. The method of claim 1, wherein generating the forecast comprises generating a plurality of forecast values up to a particular horizon.

10. One or more non-transitory machine-readable media storing instruction which, when executed by one or more processors, cause:

generating, within volatile or non-volatile memory, a set of data structures that separate sample values by season type and season space, wherein the sample values track a metric of at least one computing resource over time, wherein the set of data structures include a first set of clusters of sample values corresponding to different season types in a first season space and a second set of clusters of sample values corresponding to one or more season types in a second season space, wherein the first season space represents long-term season types and the second season space represents short-term season types, wherein the different season types in the first season space represent long-term seasonal patterns that do not fit the one or more season types in the second season space;

within the first set of clusters, generating at least one merged cluster by merging, within volatile or non-volatile memory, at least a first cluster with at least a second cluster, wherein the first cluster is most similar, relatively within the first set of clusters, to the second cluster in terms of a seasonal pattern, wherein the first cluster and the second cluster are not merged with clusters in the second set of clusters in the second season space;

determining a trend pattern for the at least one merged cluster;

generating a forecast for the metric of the at least one computing resource based, at least in part, on the trend pattern for the at least one merged cluster; and performing one or more seasonal-aware management operations based on the forecast.

11. The one or more non-transitory machine-readable media of claim 10, wherein generating the forecast comprises combining the trend pattern for the at least one merged cluster with at least one trend pattern for the second set of clusters.

12. The one or more non-transitory machine-readable media of claim 10, wherein the first set of clusters are associated with an outlier season space; and wherein the second set of clusters are associated with an observed season space.

13. The one or more non-transitory machine-readable media of claim 10, wherein generating the at least one merged cluster comprises selecting the first cluster in the first set of clusters to merge responsive to determining that the first cluster has a sample count that is lower than a threshold.

14. The one or more non-transitory machine-readable media of claim 10, wherein the second cluster is identified as the most similar, relatively within the first set of clusters, based on at least one of a seasonal factor associated with the second cluster or an encoding associated with the second cluster.

15. The one or more non-transitory machine-readable media of claim 10, wherein the instructions further cause determining a seasonal component for the at least one merged cluster; wherein the forecast is further generated based on the seasonal component for the at least one merged cluster.

16. The one or more non-transitory machine-readable media of claim 10, wherein generating the forecast comprises aggregating contributions from the at least one merged cluster associated with the first season space, at least one cluster associated with the second season space, and at least one cluster associated with an out-of-season space.

17. The one or more non-transitory machine-readable media of claim 10, wherein generating the forecast comprises aggregating contributions from the at least one merged cluster with another unmerged cluster in the first set of clusters to generate a forecast value for a particular timestamp.

18. The one or more non-transitory machine-readable media of claim 10, wherein generating the forecast comprises generating a plurality of forecast values up to a particular horizon.

19. A system comprising:
one or more hardware processors;
one or more non-transitory machine-readable media storing instruction which, when executed by the one or more hardware processors, cause:
generating, within volatile or non-volatile memory, a set of data structures that separate sample values by season type and season space, wherein the sample values track a metric of at least one computing resource over time, wherein the set of data structures include a first set of clusters of sample values corresponding to different season types in a first season space and a second set of clusters of sample values corresponding to one or more season types in a second season space, wherein the first season space represents long-term season types and the second season space represents short-term season types, wherein the different season types in the first season space represent long-term seasonal patterns that do not fit the one or more season types in the second season space;

within the first set of clusters, generating at least one merged cluster by merging, within volatile or non-volatile memory, at least a first cluster with at least a second cluster, wherein the first cluster is most similar, relatively within the first set of clusters, to the second cluster in terms of a seasonal pattern, wherein the first cluster and the second cluster are not merged with clusters in the second set of clusters in the second season space;

determining a trend pattern for the at least one merged cluster;

generating a forecast for the metric of the at least one computing resource based, at least in part, on the trend pattern for the at least one merged cluster; and performing one or more seasonal-aware management operations based on the forecast.

20. The system of claim 19, wherein generating the forecast comprises combining the trend pattern for the at least one merged cluster with at least one trend pattern for the second set of clusters.

* * * * *

UNITED STATES PATENT AND TRADEMARK OFFICE
CERTIFICATE OF CORRECTION

PATENT NO. : 11,138,090 B2
APPLICATION NO. : 16/168390
DATED : October 5, 2021
INVENTOR(S) : Garvey et al.

It is certified that error appears in the above-identified patent and that said Letters Patent is hereby corrected as shown below:

On the Title Page

Column 2, under Abstract, Line 9, after "clusters" insert -- in the --.

On page 3, Column 1, under Other Publications, Line 11, delete "2008.(IEEE" and insert -- 2008. (IEEE --, therefor.

On page 3, Column 2, under Other Publications, Line 24, delete "pattem" and insert -- pattern --, therefor.

On page 3, Column 2, under Other Publications, Line 25, delete "resouice" and insert -- resource --, therefor.

On page 4, Column 1, under Other Publications, Line 1, delete "Maste s" and insert -- Master's --, therefor.

On page 4, Column 1, under Other Publications, Line 10, delete "infrustructure" and insert -- infrastructure --, therefor.

On page 4, Column 2, under Other Publications, Line 15, delete "US.pdi" and insert -- US.pdf --, therefor.

In the Specification

In Column 1, Lines 8-9, delete ""SEASONALAWARE" and insert -- "SEASONAL AWARE --, therefor.

In Column 1, Line 16, delete "ACCOMODATING" and insert -- ACCOMMODATING --, therefor.

In Column 1, Line 20, delete "applicaton" and insert -- application --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,138,090 B2

In Column 3, Line 15, delete "embodiments" and insert -- embodiments; --, therefor.

In Column 6, Line 3, delete "without" and insert -- Without --, therefor.

In Column 9, Line 17, delete "MODEELING"," and insert -- MODELLING", --, therefor.

In Column 14, Lines 65-66, delete "15/057,065," and insert -- 14/452,283, --, therefor.

In Column 15, Lines 18-21, delete "By narrowing the focus on processing around a specific season within the encoding space, the approach may be implemented with relatively low compute overhead and is easily extensible." and insert the same on Column 15, Line 17 (Approx.) as a continuation of the same paragraph.

In Column 21, Line 24, delete "$C_l$" and insert -- $C_1$ --, therefor.

In Column 22, Line 50, delete "in in" and insert -- in --, therefor.

In Column 23, Line 33, delete "source" and insert -- source. --, therefor.